US012597973B2

(12) United States Patent
Raghavan et al.

(10) Patent No.: US 12,597,973 B2
(45) Date of Patent: Apr. 7, 2026

(54) MITIGATING IMPACTS OF ACCESSORIES ON MILLIMETER WAVE COMMUNICATIONS

(71) Applicant: QUALCOMM Incorporated, San Diego, CA (US)

(72) Inventors: Vasanthan Raghavan, West Windsor Township, NJ (US); Sinan Adibelli, San Diego, CA (US); Mohammad Ali Tassoudji, San Diego, CA (US); Igor Gutman, Hod HaSharon (IL)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/523,469

(22) Filed: Nov. 29, 2023

(65) Prior Publication Data

US 2025/0175225 A1 May 29, 2025

(51) Int. Cl.
*H04B 7/06* (2006.01)
*H04L 1/00* (2006.01)

(52) U.S. Cl.
CPC ......... *H04B 7/0617* (2013.01); *H04B 7/0632* (2013.01); *H04L 1/0003* (2013.01)

(58) Field of Classification Search
CPC .. H04B 7/0632; H04B 7/0695; H04B 7/0617; H04L 1/0003
See application file for complete search history.

(56) References Cited

U.S. PATENT DOCUMENTS

| | | | | |
|---|---|---|---|---|
| 11,240,365 | B1 * | 2/2022 | Hulbert ................... | G06F 3/165 |
| 2008/0160992 | A1 * | 7/2008 | Jalali ..................... | H04B 7/0808 |
| | | | | 455/427 |
| 2016/0093951 | A1 * | 3/2016 | Schmid .................... | H01Q 1/48 |
| | | | | 343/876 |
| 2017/0307390 | A1 * | 10/2017 | Uyeki ................ | G01C 21/3469 |
| 2018/0072313 | A1 * | 3/2018 | Stenneth ................. | G01S 17/89 |
| 2018/0321687 | A1 * | 11/2018 | Chambers ............... | G06F 16/29 |
| 2018/0359696 | A1 * | 12/2018 | Borean ................. | H04L 67/025 |

* cited by examiner

*Primary Examiner* — Brian D Nguyen
(74) *Attorney, Agent, or Firm* — Holland & Hart LLP

(57) ABSTRACT

Methods, systems, and devices for wireless communications are described. Information related to an accessory installable on the UE may be transmitted to a network entity. The installation of the accessory on the UE may be associated with an effect on a signal coverage pattern of the UE. Based on transmitting the information, communications between the UE and network entity may be performed in accordance with a set of parameters that are based on the effect of the accessory on the signal coverage pattern of the UE.

30 Claims, 17 Drawing Sheets

220
225

Information related to the accessory

Reference Signal Resources

200

510

520

515

505

500

Signaling Component

1125

Message Component

1135

Communication Component

1130

1120

1100

130 105 115

Network
Entity

Transceiver Antenna 1210 1215

Memory

Code

1230

1225

Communications
Manager

1220

1240

Processor

1235

1205

1200

Figure 13:
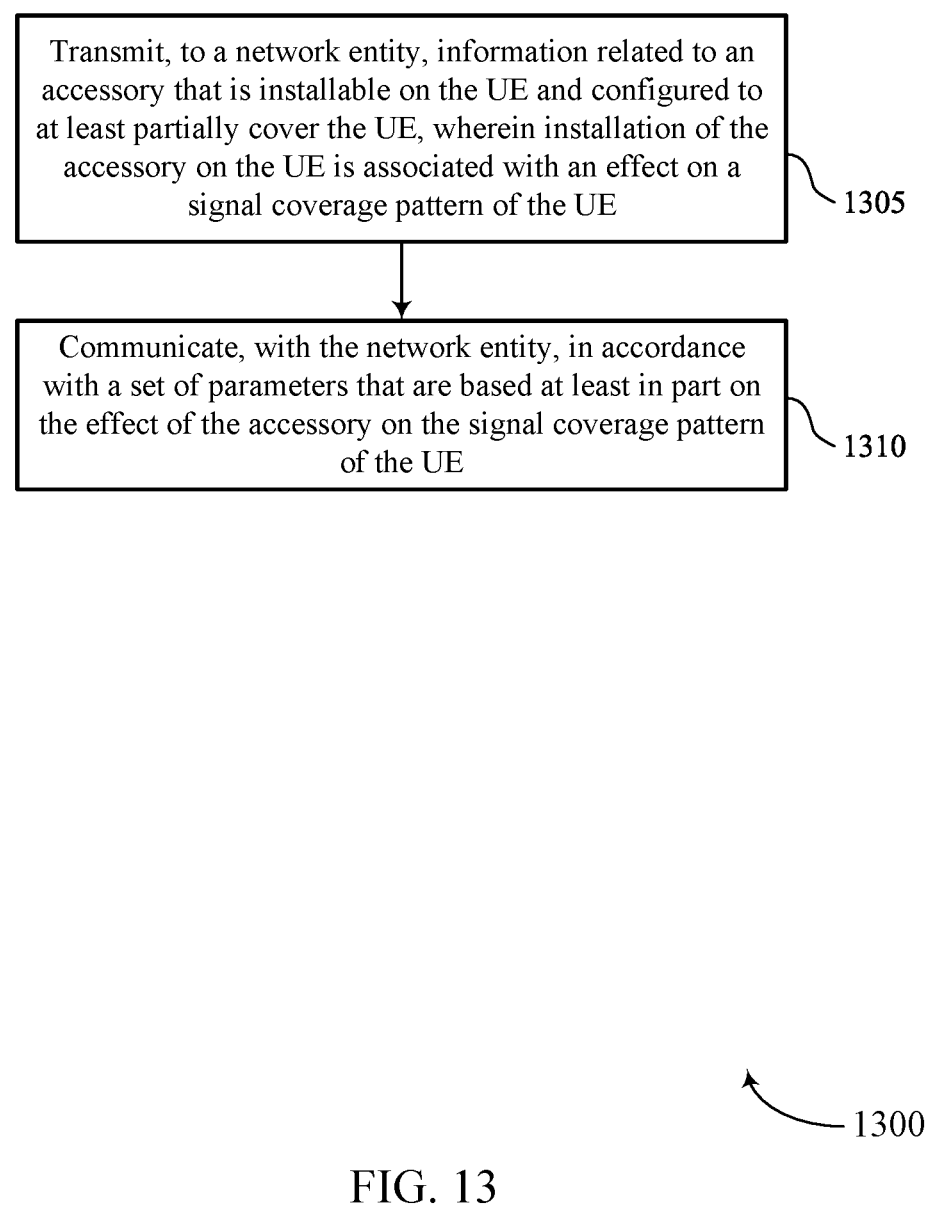

Transmit, to a network entity, information related to an
accessory that is installable on the UE and configured to
at least partially cover the UE, wherein installation of the
accessory on the UE is associated with an effect on a
signal coverage pattern of the UE

— 1305

Communicate, with the network entity, in accordance
with a set of parameters that are based at least in part on
the effect of the accessory on the signal coverage pattern
of the UE

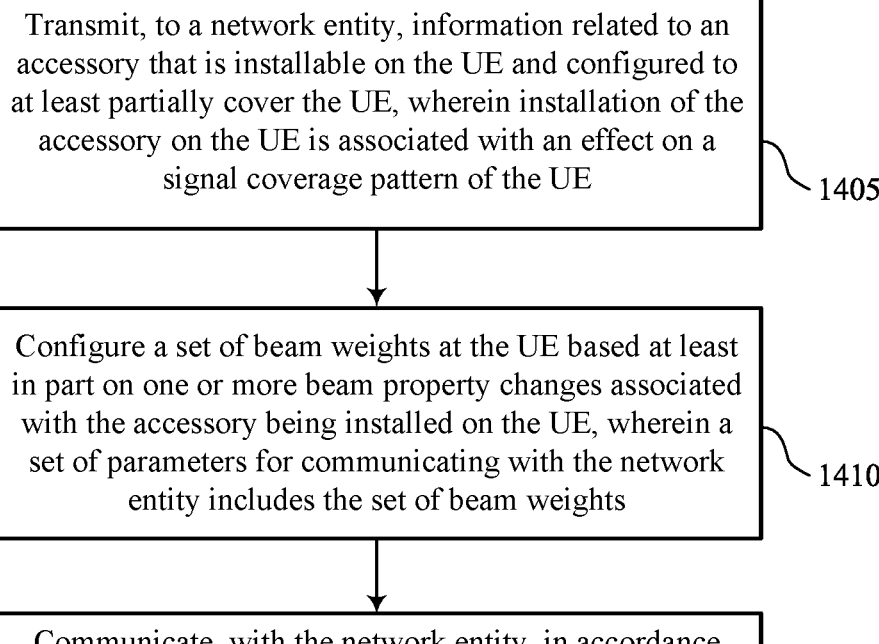

Transmit, to a network entity, information related to an accessory that is installable on the UE and configured to at least partially cover the UE, wherein installation of the accessory on the UE is associated with an effect on a signal coverage pattern of the UE    1405

Configure a set of beam weights at the UE based at least in part on one or more beam property changes associated with the accessory being installed on the UE, wherein a set of parameters for communicating with the network entity includes the set of beam weights    1410

Communicate, with the network entity, in accordance with the set of parameters that are based at least in part on the effect of the accessory on the signal coverage pattern of the UE    1415

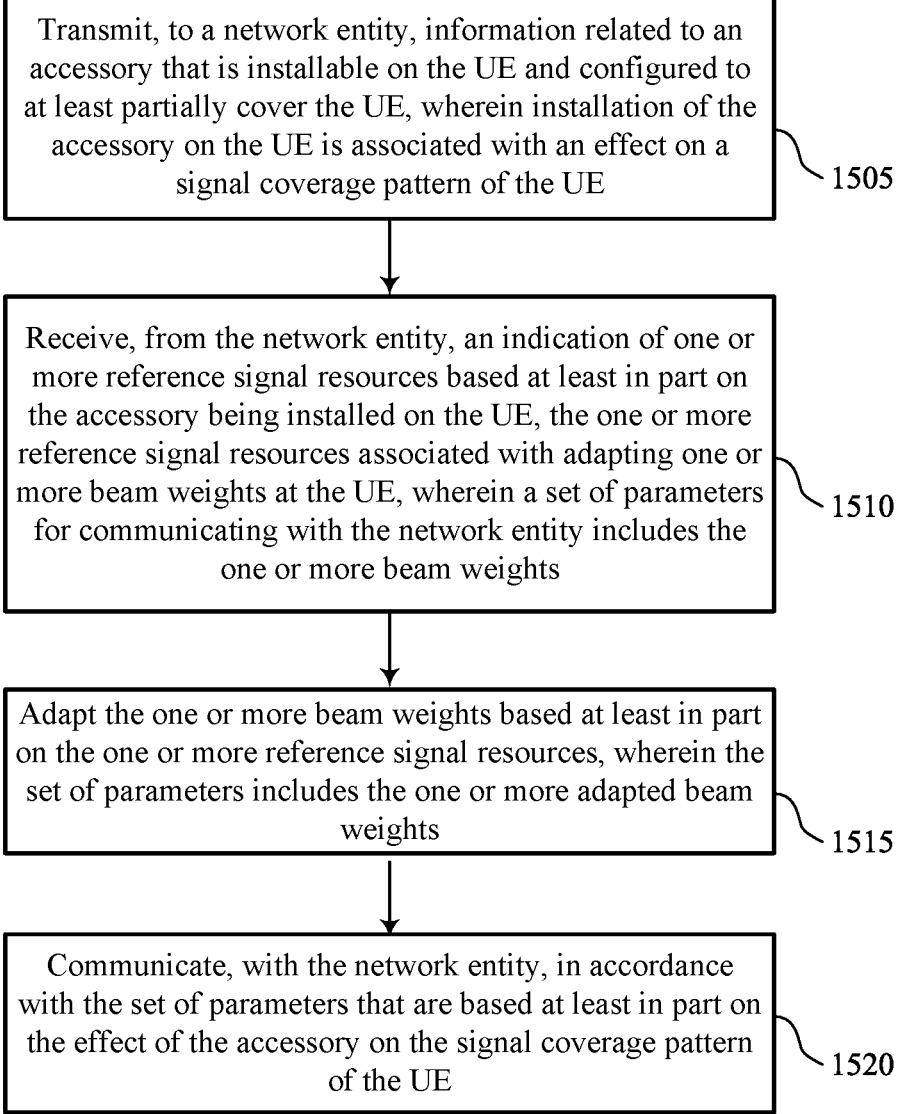

Transmit, to a network entity, information related to an accessory that is installable on the UE and configured to at least partially cover the UE, wherein installation of the accessory on the UE is associated with an effect on a signal coverage pattern of the UE ⟋ 1505

Receive, from the network entity, an indication of one or more reference signal resources based at least in part on the accessory being installed on the UE, the one or more reference signal resources associated with adapting one or more beam weights at the UE, wherein a set of parameters for communicating with the network entity includes the one or more beam weights ⟍ 1510

Adapt the one or more beam weights based at least in part on the one or more reference signal resources, wherein the set of parameters includes the one or more adapted beam weights ⟍ 1515

Communicate, with the network entity, in accordance with the set of parameters that are based at least in part on the effect of the accessory on the signal coverage pattern of the UE ⟍ 1520

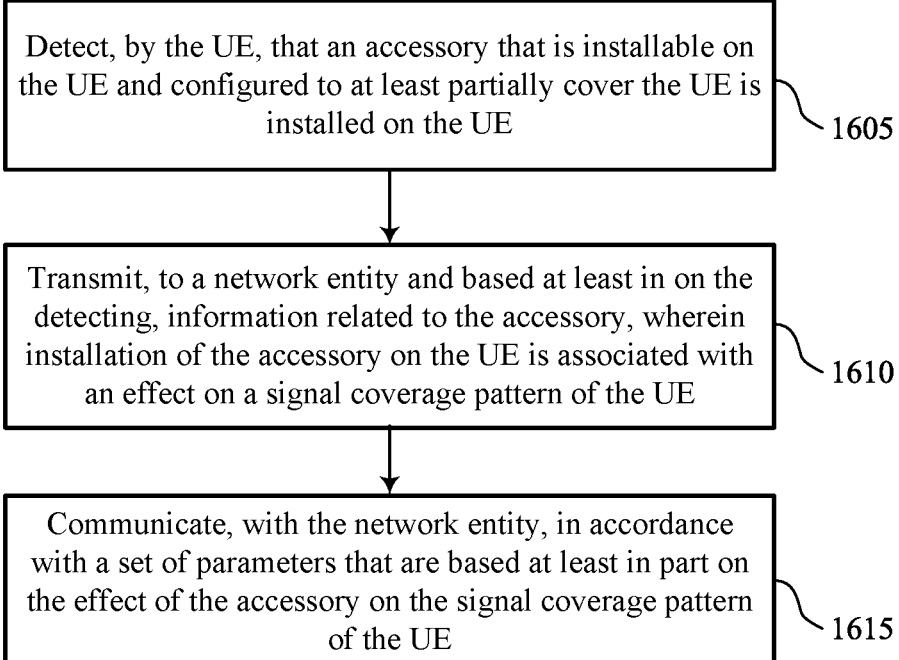

Detect, by the UE, that an accessory that is installable on the UE and configured to at least partially cover the UE is installed on the UE

1605

Transmit, to a network entity and based at least in on the detecting, information related to the accessory, wherein installation of the accessory on the UE is associated with an effect on a signal coverage pattern of the UE

1610

Communicate, with the network entity, in accordance with a set of parameters that are based at least in part on the effect of the accessory on the signal coverage pattern of the UE

Figure 17:
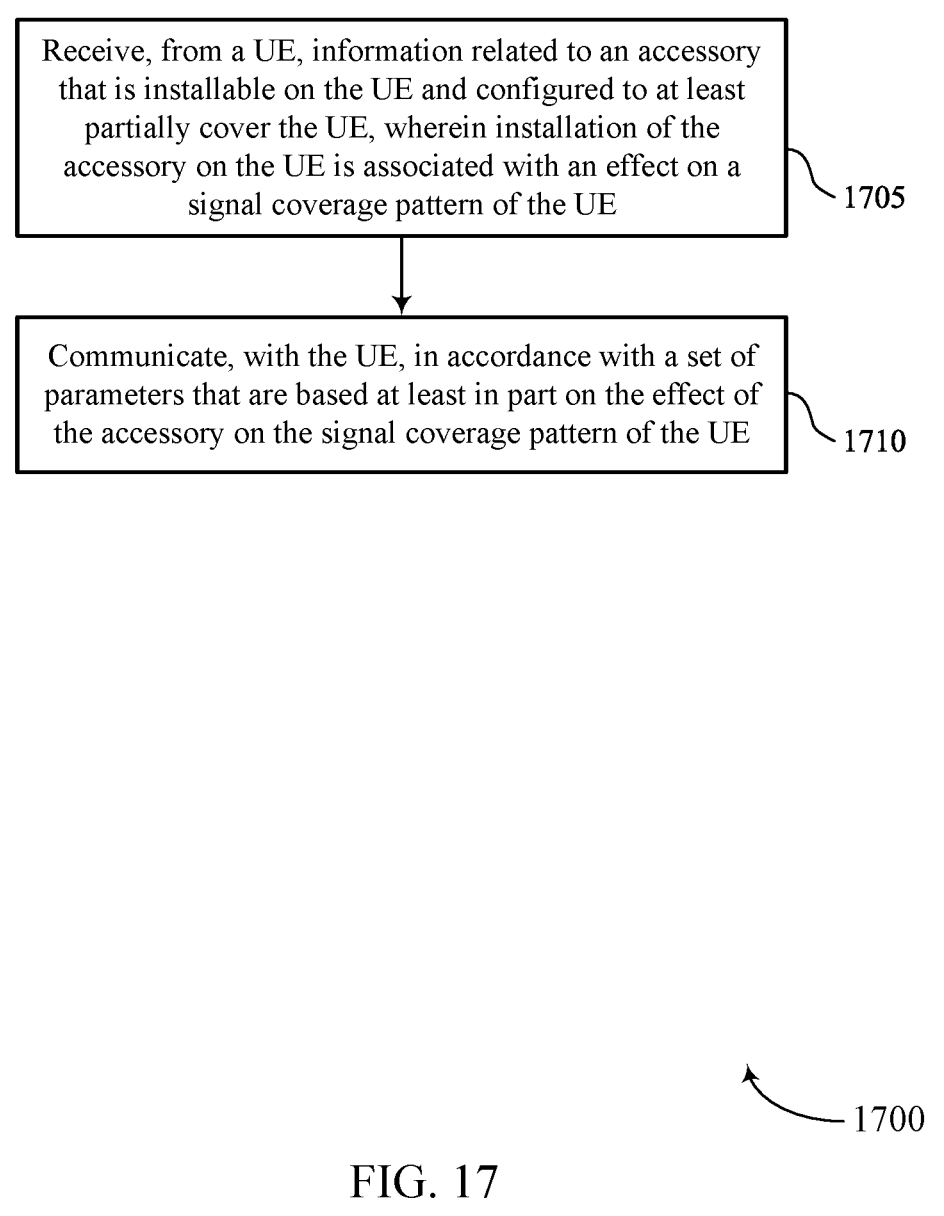

Receive, from a UE, information related to an accessory that is installable on the UE and configured to at least partially cover the UE, wherein installation of the accessory on the UE is associated with an effect on a signal coverage pattern of the UE ⟍ 1705

Communicate, with the UE, in accordance with a set of parameters that are based at least in part on the effect of the accessory on the signal coverage pattern of the UE ⟍ 1710

MITIGATING IMPACTS OF ACCESSORIES ON MILLIMETER WAVE COMMUNICATIONS

TECHNICAL FIELD

The following relates to wireless communications, including mitigating impacts of accessories on millimeter wave (mmW) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications, UEs may be equipped with accessories (e.g., phone cases or covers). In some examples, a phone case may be installed on a UE for various reasons and use cases. For examples, a phone cases may be installed on a UE for cosmetic or practical use cases (e.g., to change the look of a UE or to protect the casing of the UE).

SUMMARY

The described techniques relate to improved methods, systems, devices, and apparatuses that support mitigating impacts of accessories on millimeter wave (mmW) communications. For example, the described techniques provide for a user equipment (UE) to transmit information related to an accessory (such as a phone case or cover) installable on the UE to a network entity. Further, the installation of the accessory on the UE may be associated with an effect on a signal coverage pattern of the UE. As such, the UE may communicate with the network entity in accordance with a set of parameters that are based at least in part on the effect of the accessory on the signal coverage pattern of the UE.

A method for wireless communications by a UE is described. The method may include transmitting, to a network entity, information related to an accessory that is installable on the UE and configured to at least partially cover the UE, where installation of the accessory on the UE is associated with an effect on a signal coverage pattern of the UE and communicating, with the network entity, in accordance with a set of parameters that are based on the effect of the accessory on the signal coverage pattern of the UE.

A UE for wireless communications is described. The UE may include one or more memories storing processor executable code, and one or more processors coupled with (e.g., operatively, communicatively, functionally, electronically, or electrically) the one or more memories. The one or more processors may individually or collectively operable to execute the code (e.g., directly, indirectly, after pre-processing, without pre-processing) to cause the UE to transmit, to a network entity, information related to an accessory that is installable on the UE and configured to at least partially cover the UE, where installation of the accessory on the UE is associated with an effect on a signal coverage pattern of the UE and communicating, with the network entity, in accordance with a set of parameters that are based on the effect of the accessory on the signal coverage pattern of the UE.

Another UE for wireless communications is described. The UE may include means for transmitting, to a network entity, information related to an accessory that is installable on the UE and configured to at least partially cover the UE, where installation of the accessory on the UE is associated with an effect on a signal coverage pattern of the UE and means for communicating, with the network entity, in accordance with a set of parameters that are based on the effect of the accessory on the signal coverage pattern of the UE.

A non-transitory computer-readable medium storing code for wireless communications is described. The code may include instructions executable by one or more processors (e.g., directly, indirectly, after pre-processing, without processing) to transmit, to a network entity, information related to an accessory that is installable on the UE and configured to at least partially cover the UE, where installation of the accessory on the UE is associated with an effect on a signal coverage pattern of the UE and communicating, with the network entity, in accordance with a set of parameters that are based on the effect of the accessory on the signal coverage pattern of the UE.

In some examples of the method, UEs, and non-transitory computer-readable medium described herein, transmitting the information related to the accessory may include operations, features, means, or instructions for transmitting an indication of one or more beam property changes associated with the accessory being installed on the UE.

In some examples of the method, UEs, and non-transitory computer-readable medium described herein, transmitting the information related to the accessory may include operations, features, means, or instructions for transmitting an indication of whether the accessory may be installed on the UE.

In some examples of the method, UEs, and non-transitory computer-readable medium described herein, transmitting the information related to the accessory may include operations, features, means, or instructions for transmitting information that indicates one or more properties of the accessory.

In some examples of the method, UEs, and non-transitory computer-readable medium described herein, the one or more properties of the accessory includes one or more materials included in the accessory, a dielectric constant associated with the accessory, a loss tangent associated with the accessory, a thickness of the accessory, or any combination thereof.

Some examples of the method, UEs, and non-transitory computer-readable medium described herein may further include operations, features, means, or instructions for querying a database for the one or more properties of the accessory and obtaining, from the database, the one or more properties of the accessory based on querying the database.

In some examples of the method, UEs, and non-transitory computer-readable medium described herein, transmitting the information related to the accessory may include operations, features, means, or instructions for transmitting an indication of one or more signal coverage metrics for the UE associated with the installation of the accessory on the UE, where the one or more signal coverage metrics may be based on the signal coverage pattern of the UE associated with the installation of the accessory on the UE.

Some examples of the method, UEs, and non-transitory computer-readable medium described herein may further include operations, features, means, or instructions for receiving, from the network entity, a message indicating whether a signal coverage metric of the one or more signal coverage metrics satisfies a corresponding signal coverage metric threshold.

In some examples of the method, UEs, and non-transitory computer-readable medium described herein, the one or more signal coverage metrics includes an indication of an in-coverage signal coverage, an indication of an out-of-coverage signal coverage, or both.

Some examples of the method, UEs, and non-transitory computer-readable medium described herein may further include operations, features, means, or instructions for receiving, from the network entity, a message indicating a modulation and coding scheme that may be based on the one or more signal coverage metrics indicated via the information related to the accessory, where the set of parameters for communicating with the network entity includes the modulation and coding scheme.

In some examples of the method, UEs, and non-transitory computer-readable medium described herein, transmitting the information related to the accessory may include operations, features, means, or instructions for transmitting a first indication of one or more signal coverage metrics for a first frequency range and associated with the installation of the accessory on the UE and a second indication of the one or more signal coverage metrics for a second frequency range and associated with the installation of the accessory on the UE.

Some examples of the method, UEs, and non-transitory computer-readable medium described herein may further include operations, features, means, or instructions for configuring a set of beam weights at the UE based on one or more beam property changes associated with the accessory being installed on the UE, where the set of parameters for communicating with the network entity includes the set of beam weights.

In some examples of the method, UEs, and non-transitory computer-readable medium described herein, loading, from memory of the UE and based on the one or more beam property changes associated with the accessory being installed on the UE, a codebook associated with the accessory being installed on the UE and selecting, from the codebook, the configured set of beam weights.

Some examples of the method, UEs, and non-transitory computer-readable medium described herein may further include operations, features, means, or instructions for receiving, from the network entity, an indication of one or more reference signal resources based on the accessory being installed on the UE, the one or more reference signal resources associated with adapting one or more beam weights at the UE, where the set of parameters for communicating with the network entity includes the one or more beam weights and adapting the one or more beam weights based on the one or more reference signal resources, where the set of parameters includes the one or more adapted beam weights.

Some examples of the method, UEs, and non-transitory computer-readable medium described herein may further include operations, features, means, or instructions for performing a first signal quality measurement on a communication link between the UE and the network entity before the accessory may be installed on the UE, performing a second signal quality measurement of the communication link while the accessory may be installed on the UE, and transmitting, to the network entity, a message indicating a difference between the first signal quality measurement and the second signal quality measurement.

Some examples of the method, UEs, and non-transitory computer-readable medium described herein may further include operations, features, means, or instructions for receiving, from the network entity, a message including an indication of a signal quality of a communication link between the UE and the network entity when the accessory may be installed on the UE.

In some examples of the method, UEs, and non-transitory computer-readable medium described herein, receiving the message indicating the signal quality of the communication link may include operations, features, means, or instructions for receiving, from the network entity, an indication of whether to keep the accessory installed on the UE, an indication of a change to a modulation and coding scheme that may be based on the accessory being installed on the UE, an indication to switch beams that may be based on the accessory being installed on the UE, or any combination thereof and transmitting, to the network entity, a second message indicating of whether the accessory remains installed on the UE, whether the modulation and coding scheme may be changed, whether the beams may be switched, or any combination thereof.

In some examples of the method, UEs, and non-transitory computer-readable medium described herein, transmitting the information related to the accessory may include operations, features, means, or instructions for transmitting information that indicates a type of the accessory, a model number of the accessory, a model indicator of the accessory, a manufacturer of the accessory, or any combination thereof.

Some examples of the method, UEs, and non-transitory computer-readable medium described herein may further include operations, features, means, or instructions for detecting, by the UE, that the accessory may be installed on the UE, where the information related to the accessory may be transmitted based on the detecting.

In some examples of the method, UEs, and non-transitory computer-readable medium described herein, the accessory may be a phone case or a cover for the UE.

A method for wireless communications by a network entity is described. The method may include receiving, from a UE, information related to an accessory that is installable on the UE and configured to at least partially cover the UE, where installation of the accessory on the UE is associated with an effect on a signal coverage pattern of the UE and communicating, with the UE, in accordance with a set of parameters that are based on the effect of the accessory on the signal coverage pattern of the UE.

A network entity for wireless communications is described. The network entity may include one or more memories storing processor executable code, and one or more processors coupled with (e.g., operatively, communicatively, functionally, electronically, or electrically) the one or more memories. The one or more processors may individually or collectively operable to execute the code (e.g., directly, indirectly, after pre-processing, without pre-processing) to cause the network entity to receive, from a UE, information related to an accessory that is installable on the UE and configured to at least partially cover the UE, where installation of the accessory on the UE is associated with an effect on a signal coverage pattern of the UE and communicating, with the UE, in accordance with a set of parameters that are based on the effect of the accessory on the signal coverage pattern of the UE.

Another network entity for wireless communications is described. The network entity may include means for receiving, from a UE, information related to an accessory that is installable on the UE and configured to at least partially cover the UE, where installation of the accessory on the UE is associated with an effect on a signal coverage pattern of the UE and means for communicating, with the UE, in accordance with a set of parameters that are based on the effect of the accessory on the signal coverage pattern of the UE.

A non-transitory computer-readable medium storing code for wireless communications is described. The code may include instructions executable by one or more processors (e.g., directly, indirectly, after pre-processing, without processing) to receive, from a UE, information related to an accessory that is installable on the UE and configured to at least partially cover the UE, where installation of the accessory on the UE is associated with an effect on a signal coverage pattern of the UE and communicating, with the UE, in accordance with a set of parameters that are based on the effect of the accessory on the signal coverage pattern of the UE.

In some examples of the method, network entities, and non-transitory computer-readable medium described herein, receiving the information related to the accessory may include operations, features, means, or instructions for receiving an indication of one or more signal coverage metrics for the UE associated with the installation of the accessory on the UE, where the one or more signal coverage metrics may be based on the signal coverage pattern of the UE associated with the installation of the accessory on the UE.

Some examples of the method, network entities, and non-transitory computer-readable medium described herein may further include operations, features, means, or instructions for transmitting, to the UE, a message indicating whether a signal coverage metric of the one or more signal coverage metrics satisfies a corresponding signal coverage metric threshold.

Some examples of the method, network entities, and non-transitory computer-readable medium described herein may further include operations, features, means, or instructions for transmitting, to the UE, a message indicating a modulation and coding scheme that may be based on the one or more signal coverage metrics indicated via the information related to the accessory, where the set of parameters for communicating with the network entity includes the modulation and coding scheme.

Some examples of the method, network entities, and non-transitory computer-readable medium described herein may further include operations, features, means, or instructions for transmitting, to the UE, a message including an indication of a signal quality of a communication link between the UE and the network entity when the accessory may be installed on the UE.

In some examples of the method, network entities, and non-transitory computer-readable medium described herein, transmitting the message indicating the signal quality of the communication link may include operations, features, means, or instructions for transmitting, to the UE, an indication of whether to keep the accessory installed on the UE, an indication of a change to a modulation and coding scheme that may be based on the accessory being installed on the UE, an indication to switch beams that may be based on the accessory being installed on the UE, or any combination thereof and receiving, from the UE, a second message indicating whether the accessory remains installed on the UE, whether the modulation and coding scheme may be changed, whether the beams may be switched, or any combination thereof.

BRIEF DESCRIPTION OF THE DRAWINGS

FIGS. 13 through 17 show flowcharts illustrating methods that support mitigating impacts of accessories on mmW communications in accordance with one or more aspects of the present disclosure.

DETAILED DESCRIPTION

Figure 1:
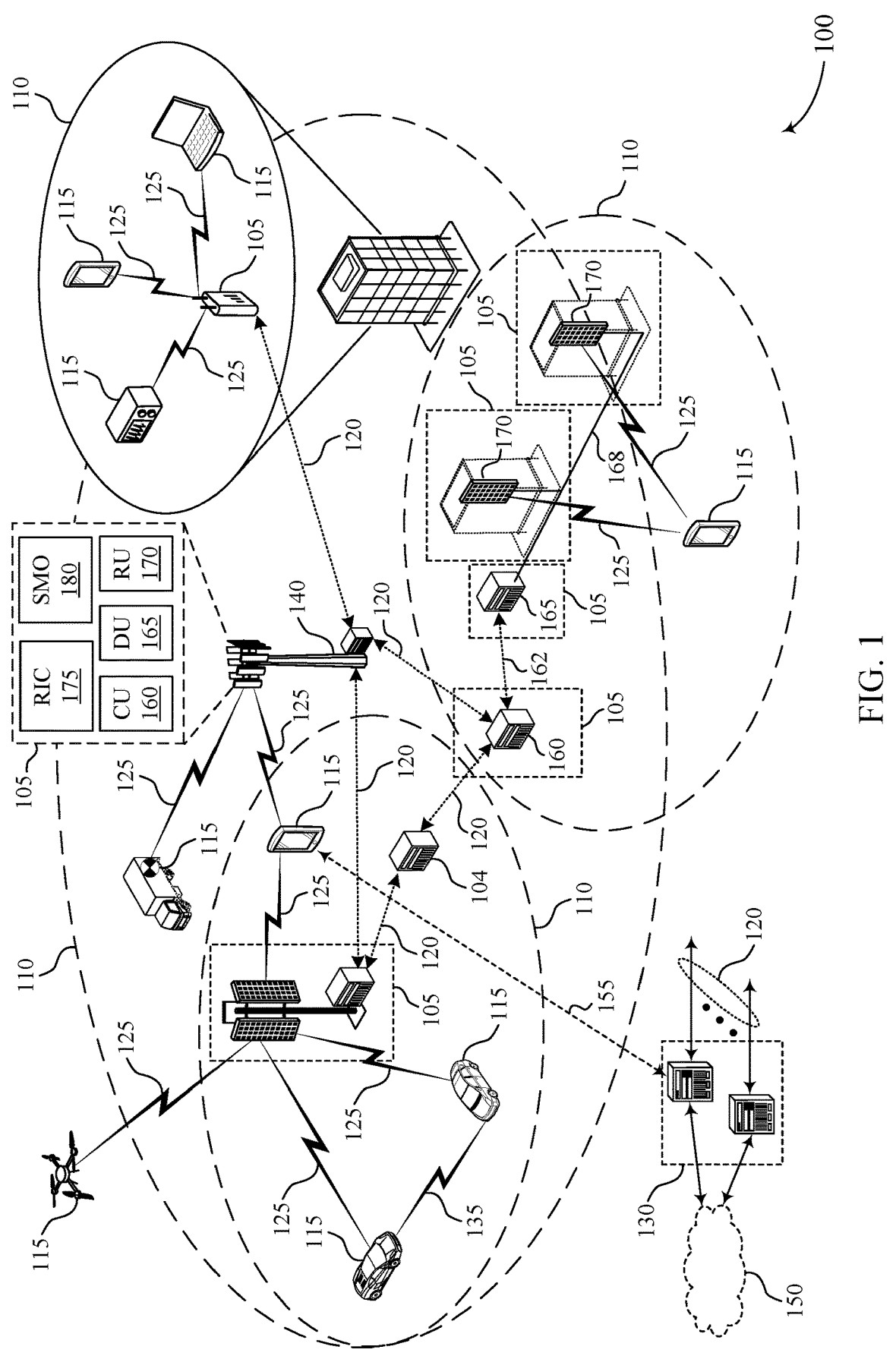
FIGS. 1 and 2 show examples of wireless communications systems that supports mitigating impacts of accessories on millimeter wave (mmW) communications in accordance with one or more aspects of the present disclosure.

In some wireless communications systems, user equipment (UEs) may communicate with a network entity on different frequency ranges using beamforming via millimeter wave (mmW) communications. When performing beamforming, a UE may be configured with an analog beamforming codebook for a respective frequency. In some cases, a manufacturer of a UE may design an analog beamforming codebook for the UE based on electromagnetic field measurements or simulations of electromagnetic fields with a solver. In some examples, the analog beamforming codebook may be designed based on the housing materials of a UE. However, in some cases, a UE may have an accessory (e.g., a phone case, a stick-on wallet, a phone stand, or a pop socket) installed on the UE—e.g., for cosmetic and practical use cases.

In some examples, when an accessory is installed on a UE, the UE may experience some change in the effectiveness and reliability of communications when performing mmW communications via beamforming. For example, the UE may see an increase in performance in some directions and a decrease in performance in other directions when an accessory is installed (e.g., a phone case on a UE may affect a signal coverage pattern of the UE). As such, having an accessory installed on a UE may improve or degrade the performance of an analog beamforming codebook. Moreover, the increase and decreases in the performance (e.g., the effect on the signal coverage pattern) may be relatively random for different accessories (e.g., including of the same type) based on the materials of the accessories, a dielectric constant of the materials of the accessory, a loss tangent, or any combination thereof. Therefore, a UE may be unable to adjust an analog beamforming codebook to enhance the performance of mmW communications when an accessory is installed on the UE.

The techniques of the present disclosure describe transmitting, by a UE to a network entity, information related to an accessory that is installable on the UE—e.g., to reduce the effect on mmW beamforming communications caused by changes to the signal coverage pattern of the UE by the installation. In some cases, the information related to the accessory that the UE transmits to the network entity may include an indication of whether an accessory is installed on the UE and indications of performance gains and losses due to the accessory being installed on the UE. In some cases, the UE may also indicate one or more beam property changes due to an accessory being installed on the UE. Additionally, or alternatively, the UE may also reconfigure the codebook (e.g., analog beamforming codebook) that the UE uses for beamforming or adapt the beam weights that the UE uses based on the accessory being installed on the UE.

In some examples, the UE or the network entity may also measure the signal quality of a communication link between the UE and the network entity both with and without the accessory installed. Using such signal quality measurements, the UE, the network entity, or both may be capable of determining whether the accessory negatively impacts the communications between the UE and the network entity. In some cases, based on the signal quality measurements, the network entity may transmit one or more suggestions to the UE indicating ways to improve the communications between the UE and the network entity. After the UE receives the suggestions, the UE may determine whether to accept any of the suggestions from the network entity. As such, the techniques of the present disclosure may allow a UE, a network entity, or both, the capability of improving communications (e.g., mmW communications) between a UE and a network entity when an accessory is installed on the UE.

Aspects of the disclosure are initially described in the context of wireless communications systems. Additional aspects of the disclosure are described with reference to a wireless communications system and process flows. Aspects of the disclosure are further illustrated by and described with reference to apparatus diagrams, system diagrams, and flowcharts that relate to mitigating impacts of accessories on mmW communications.

FIG. 1 shows an example of a wireless communications system 100 that supports mitigating impacts of accessories on mmW communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system, may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support mitigating impacts of accessories on mmW communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, or a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

mmW communications may be an example of a form of wireless communications that operates within a relatively high frequency range (e.g., 30-300 GHz) with relatively short wavelengths (e.g., wavelengths in the millimeter range). Further, by using such short wavelengths, UEs 115 may be capable of transmitting large quantities of data at relatively fast speed. As such, mmW communications may be used for URLLC communications, high reliability low latency communications (HRLLC), and other types of communications that rely on fast data transmissions, low latency, and are used to connect to a relatively large quantity of wireless devices (e.g., UEs 115, network entities 105, or both).

In some examples, a UE 115 may be an extended reality (XR) device. In such examples, mmW communications may be useful for XR devices since XR devices rely on high reliability, low latency, and relatively fast communications. XR devices may include virtual reality (VR) systems, augmented reality (AR) systems, mixed reality (MR) systems, or any combination thereof. As such, XR devices may rely on mmW communications to provide high data throughputs and multi-user environments since mmW communication techniques may allow for a UE 115 (e.g., XR device) to support connections to large quantities of wireless devices (e.g., UEs 115, network entities 105, or both). Further, by using mmW communications, XR devices may experience an increase in user experience.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Beamforming codebooks may be used to improve a performance (e.g., a signal quality) of beamformed communications between wireless devices (e.g., UEs 115, base stations 140, network entities 105). In some examples, different beamforming codebooks may be used at (e.g., be better suited to) different frequency ranges (e.g., FR2, FR3). In some examples, the beamforming codebooks indicate different sets of beam weights to be applied to signals received at antennas of a wireless device, signals transmitted using antennas of the wireless device (e.g., a UE 115), or both. Applying an indicated set of beam weights to the signals may increase a gain (e.g., a signal-to-noise ratio) associated with beamformed signals received from or transmitted to another wireless device (e.g., a base station 140)—e.g., relative to a different set of beam weights. In some examples, the entries in a beamforming codebook are predetermined (e.g., during a testing phase) and stored in a memory of a wireless device (e.g., a UE 115). In such cases, the wireless device may select, for subsequent communications an entry in the beamforming codebooks (corresponding to a set of weights) based on current channel conditions (e.g., derived using a Layer 1 reference signal received power (L1-RSRP) measurement) between the wireless device and a corresponding wireless device.

In some examples, the entries in the beamforming codebooks are determined during pre-deployment testing procedures of one or more types of wireless devices. For example, the beamforming codebooks for different frequency ranges may be determined using electric field simulations for a type of wireless device, electric field measurements of one or more wireless devices of the type of wireless device, or both. In some examples, the testing procedures may be performed using pre-deployment wireless devices (e.g., wireless devices that are received direct from the manufacturer without any modification to the wireless device, such as the installation of any accessories on the wireless device.

Wireless devices are often used with accessories (e.g., phone cases, stick-on wallets, phone stands) after deployment into the market—e.g., to protect the wireless device from damage, to add functionality (e.g., a wallet functionality, a stand functionality) to the wireless device, for aesthetic purposes. However, an accessory that is added to a wireless device may affect the performance of the wireless device with respect to communications. For example, adding one accessory may hinder the performance of a wireless device when it comes to sending and receiving beamformed communications, while adding a different accessory may improve the performance of the wireless device. Moreover, in some examples, the effects of an accessory on communications may be different at different frequency ranges (e.g., in the FR2 band relative to the FR1 band). Additionally, or alternatively, the effect of an accessory on communications may be random, such that, in a first frequency range, the wireless device may experience communication improvements (e.g., signal gains) in a first set of indeterminate directions (e.g., in an out-of-coverage region) and communication degradation (e.g., signal loss) in a second set of indeterminate directions. And, in some examples, in a second frequency range, the wireless device may experience communication improvements (e.g., signal gains) in a third set of indeterminate directions and communication degradation (e.g., signal loss) in a fourth set of indeterminate directions.

In some examples, for beamformed communications, a beamforming codebook that includes a particular sets of beam weights may result in improved communication performance for the wireless device when a particular accessory is installed relative to the available sets of beam weights included in a beamforming codebook generated for the type (e.g., make, model) of the wireless device without an accessory (e.g., as a result of signal gains in an out-of-coverage region). In such cases, each of the sets of beam weights selected (e.g., based on L1-RSRP measurements) in a beamforming codebook generated for wireless devices without accessories may perform sub-optimally relative to a different sets of beam weights available in a different beamforming codebook that would otherwise be generated for a wireless device using the particular accessory (or an accessory similar to the particular accessory). One option for accommodating the varying effects of accessories on communications would be to test wireless devices with the accessories available to a user and to generate corresponding beamforming codebooks for the available accessories.

However, testing wireless devices with available accessories and generating corresponding beamforming codebooks would be infeasible due to the many different types of accessories, the many different types of materials used for the accessories, the many different designs for the accessories, the different thicknesses of the accessories, the option to install different accessories on a wireless device, or new accessories being introduced after a wireless device is introduced into the market. Thus, mechanisms (e.g., methods, systems, apparatuses, techniques, configurations, components) that support dynamically adapting beamformed communications to an accessory currently installed on a wireless device may be desired.

To dynamically adapt beamformed communications to an accessory currently installed on a wireless device, a wireless device may report information related to the accessory (e.g., whether an accessory is used, a dielectric constant associated with the accessory, a change in a gain/loss distribution), and communication parameters (e.g., an MCS for the wireless device, a beamforming codebook) for the wireless device may be modified in accordance with the reported information. In some examples, the reported information is frequency dependent—e.g., different information is reported for different frequency ranges. In some examples, a different beamforming codebook (than a default beamforming codebook) may be selected by the wireless device when the accessory is installed.

In some examples, a UE 115 may transmit, to a network entity 105 (e.g., a base station 140), information related to an accessory (e.g., an accessory) that is installable on the UE 115, where the accessory may affect a signal coverage pattern of the UE 115 if the accessory is installed on the UE 115. For example, installation of the accessory may cause signal gains in first portions of an out-of-coverage region of the signal coverage pattern of the UE 115, signal losses in second portions of the out-of-coverage region of the signal coverage pattern of the UE 115, signal gains/losses in the in-coverage region of the signal coverage pattern of the UE 115. The information transmitted by the UE 115 may include an indication of whether the accessory is installed on the UE 115, properties of the accessory (e.g., types of materials, dielectric constants or a range of dielectric constant values, a loss tangent), signal characteristics associated with the accessory (e.g., effective isotropic radiating power (EIRP) gain/loss, Effective Isotropic Sensitivity (EIS) gain/loss) at one or more frequency ranges, signal characteristics associated with the accessory (e.g., signal gain/loss) in an out-of-coverage region of the signal coverage pattern of the UE 115, beam property changes associated with the installation of the accessory. Based on transmitting the information related to the accessory, the UE 115 may communicate with the network entity 105 in accordance with a set of communication parameters that are adapted to the effect of the accessory on the signal coverage pattern of the UE 115, where the effect may be derived from the transmitted information. The set of parameters may include an adapted MCS, an adapted or different beam, a reconfigured beamforming codebook, an adapted beamforming codebook.

By exchanging, between a UE 115 and network entity 105, signaling related to an accessory installable on the UE 115, the UE 115 and network entity 105 may adapt communication parameters to the effects of the accessory on the UE 115, which may result in increased throughput and/or reliability of communications between the UE 115 and network entity 105.

Figure 2:
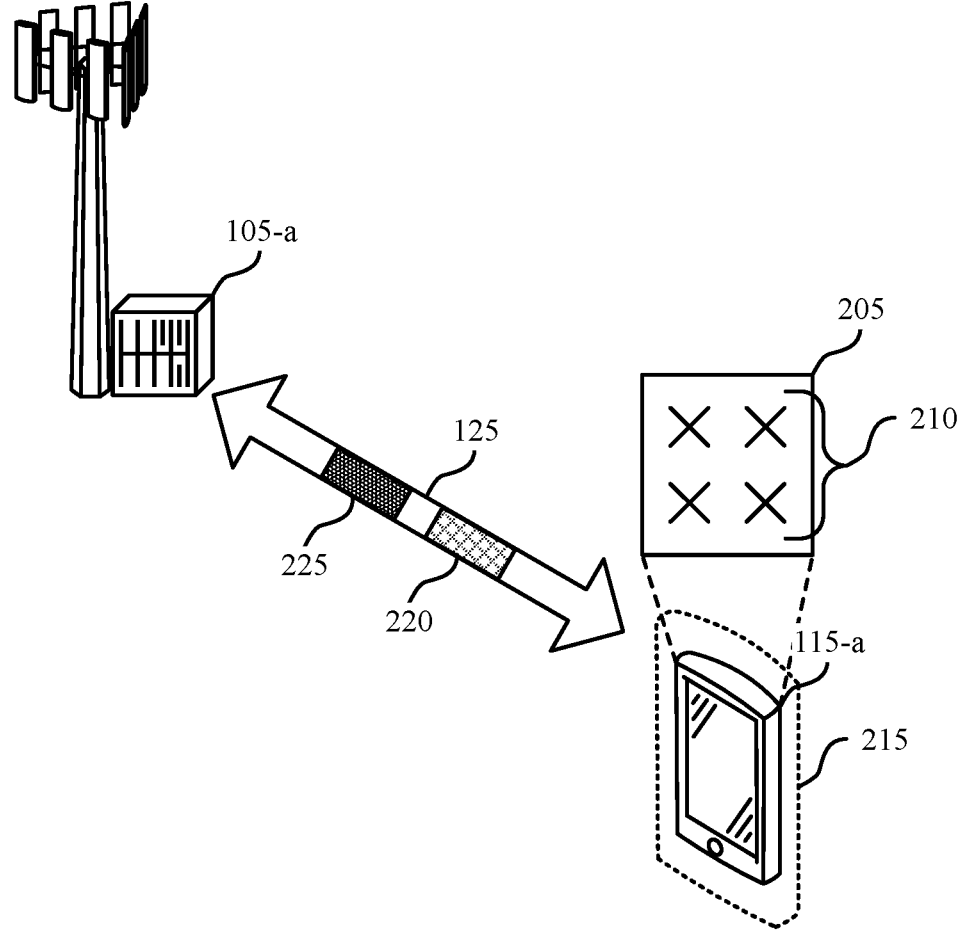
Figure 2:
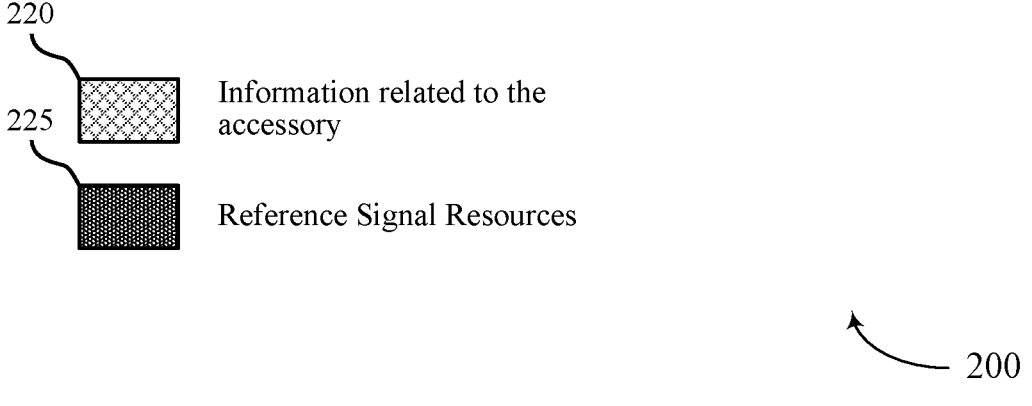

FIG. 2 shows an example of a wireless communications subsystem 200 that supports mitigating impacts of accessories on mmW communications in accordance with one or more aspects of the present disclosure. In some examples, the wireless communications subsystem 200 may implement or be implemented by the wireless communications system 100. For example, the wireless communications subsystem 200 may include a network entity 105-a and a UE 115-a. In some examples, the UE 115-a may be configured with an antenna panel 205 that includes one or more antenna elements 210, which may represent examples of corresponding devices described herein, including with reference to FIG. 1. The network entity 105-a may communicate with the UE 115-a via a communication link 125. The communication link 125 may be examples of a Uu link, a sidelink, a backhaul link, a D2D link or some other type of communication link 125 described herein with reference to FIG. 1.

To support mmW communications, UEs 115 (e.g., the UE 115-a) may perform beamforming at the RF or intermediate frequency (IF) level to close the link budget for respective frequency ranges (FR) (e.g., FR2/FR3 and beyond frequencies). As such, to support beamforming via mmW communications, the UE 115-a may be configured with an analog beamforming codebook with a set of beamforming weights pre-configured for particular directions, or particular channel conditions. The UE 115-a may apply the set of beamforming weights to respective antenna elements 210 of the antenna panel 205. In some examples, based on environmental conditions, the UE 115-a may update the beamforming weights being used for communications with the network entity 105-a by selecting a different set of beamforming weights that are included in the analog beamforming codebook—e.g., as a particular entry. For example, UEs 115 performing beamforming for mmW communications may be limited to relatively short propagation distances and may experience an increase in interference due to obstacles (e.g., buildings, walls, reflective surfaces such as glass or metal, living matter, or any combination thereof). As such, to increase the reliability of beamforming for mmW communications, after encountering such obstacles, the UE 115-a may select a different set of beamforming weights from the analog beamforming codebook that are better-suited for communicating in the presence of obstacles.

Further, the design and configuration for the analog beamforming codebook for the UE 115-a may be based on electrical field simulations and measurements. In some examples, the design of the analog beamforming codebook may be based on the impact of the housing of the UE 115-a on beamforming communications (e.g., mmW beamforming). For example, the materials that make up the housing of the UE 115-a may impact the beamforming performance of the UE 115-a. However, in some examples, users of the UE 115-a may install an accessory 215 on the UE 115-a which can cause some additional impact on the beamforming performance of the UE 115-a. As described herein, an accessory 215 may be an example of anything that can be installed on the UE 115-a that adds additional material to the UE 115-a, such as a phone case, a stick-on wallet, a pop socket, a phone stand. In some cases, the accessory 215 may at least partially cover, block, or otherwise impact the antenna panel 205 of the UE 115-a which may result in the accessory 215 causing some impact on the beamforming performance of the UE 115-a. Additionally, or alternatively, the UE 115-a may also have more than one antenna panel 205 at different locations of the UE 115-a which the accessory 215 may impact.

As such, a user may install the accessory 215 on the UE 115-a where the type of accessory 215 installed on the UE 115-a is up to the user. For example, the user may install the accessory 215 on the UE 115-a for cosmetic reasons (e.g., to improve the appearance of the UE 115-a) or for practical reasons (e.g., to improve the protection of the UE 115-a or for a specific use-case). Further, the type of accessory 215 installed on the UE 115-a may change with time as a user wishes to change the appearance of the UE 115-a or wishes to provide a different level of protection for the UE 115-*a*. Moreover, there may be many different types or variants of accessories 215 that can be installed on the UE 115-*a* based on different manufacturers of the different accessories 215. For example, some accessories 215 may be manufactured by manufacturers other than the original equipment manufacturer (OEM) or the original device manufacturer (ODM) of the UE 115-*a*, thus resulting in the accessory 215 being designed without accounting for any beamforming impacts. Further, manufacturers may also refrain from designing and manufacturing an accessory 215 based on advice from the UE 115-*a* OEM. Additionally, or alternatively, different accessories 215 designed and manufactured by different manufacturers may have different costs, different materials compositions or mixes, different thicknesses of materials, or any combination thereof.

Therefore, based on the varying properties of the different accessories 215, the performance of the UE 115-*a* may vary due to the properties of the accessory 215, the frequency being used by the UE 115-*a*, the beam weights (e.g., the steering angle) being used by the UE 115-*a*, or any combination thereof. As such, the installation of the accessory 215 on the UE 115-*a* may be associated with an effect on a signal coverage pattern of the UE 115-*a*. Moreover, in some cases, the effect the accessory 215 may have on the signal coverage pattern of the UE 115-*a* may be relatively random. For example, some directions of the signal coverage pattern of the UE 115-*a* may have signal quality gains and other directions may have signal quality losses due the accessory 215 being installed on the UE 115-*a*. Such signal quality gains and losses may be a result of the properties of the accessory 215 and the frequency being used by the UE 115-*a*.

As such, to support a more efficient and reliable wireless communication system (e.g., the wireless communications subsystem 200), the techniques of the present disclosure may describe the UE 115-*a* being capable of transmitting information 220 related to the accessory 215 installed on the UE 115-*a* to the network entity 105-*a*. Thus, the techniques of the present disclosure may enable the UE 115-*a*, the network entity 105-*a*, or both the capability of mitigating the impacts of accessories 215 (e.g., phone cases) on mmW communications. For example, the UE 115-*a* may also use the information 220 to enhance the performance of the UE 115-*a* by making use of any signal quality gains resulting from the accessory 215 being installed on the UE 115-*a*.

In some examples, the information 220 related to the accessory 215 may be an example of a UE 115 capability message or may be transmitted via a UE capability message. For example, the information 220 related to the accessory 215 (e.g., the UE 115 capability message) may indicate to the network entity 105-*a* whether an accessory 215 is installed on the UE 115-*a*. In some cases, the indication of whether the accessory 215 is installed on the UE 115-*a* may be a binary indication (e.g., installed or not installed). As such, the UE 115-*a* may indicate whether the accessory 215 is installed on the UE 115-*a* via a single bit where a value of 1 may indicate that the accessory 215 is installed on the UE 115-*a* and a value of 0 may indicate the accessory 215 is not installed on the UE 115-*a*, or vice versa. In some cases, to transmit such an indication, the UE 115-*a* may detect if the accessory 215 is installed on the UE 115-*a* via one or more sensors of the UE 115-*a*. In some other cases, a user of the UE 115-*a* may toggle a setting of the UE 115-*a* or input some information into the settings of the UE 115-*a* to indicate that the accessory 215 is installed on the UE 115-*a*. In some examples, the UE 115-*a* may transmit the information 220 related to the accessory 215 to the network entity 105-*a* based on the UE 115-*a* detecting or determining via a user input that the accessory 215 is installed on the UE 115-*a*.

Additionally, or alternatively, the information 220 related to the accessory 215 may also indicate the make and model of the accessory 215 (e.g., a model number), the brand or manufacturer of the accessory 215, or any combination thereof. In some cases, the user of the UE 115-*a* may input the type of accessory 215 being used when indicating that an accessory 215 is installed on the UE 115-*a*. In some other cases, during a setup procedure of the UE 115-*a* the user may be prompted to input whether an accessory 215 is installed on the UE 115-*a*, and if so, the user may be further prompted to input the type of accessory 215. In some examples, the information 220 related to the accessory 215 may also include an indication of one or more properties of the accessory 215 based on the type of accessory 215 that is installed on the UE 115-*a*. The one or more properties of the accessory 215 may include the materials included in the accessory 215, a dielectric constant or a range of dielectric constant values associated with the accessory 215, a loss tangent or a range of loss tangent values associated with the accessory 215, a thickness of the accessory 215, or any combination thereof.

Since different manufacturers may make and design different accessories 215 which a user can install for different reasons (e.g., practical reasons, cosmetic reasons) different accessories 215 may have different materials and thus may be associated with different properties. For example, the materials of an accessory 215 may include thermoplastic polyurethane (TPU), polycarbonate, silicone, rubber, leather, wood, metal, alloyed material, or any combination thereof. In some cases, an accessory 215 may be associated with more than one type of material and may be made up of a composite or mix of materials. As such, the information 220 related to the accessory 215 may indicate all the materials used within the accessory 215 that is installed on the UE 115-*a*.

In addition to the information 220 related to the accessory 215 including the material(s) used in the accessory 215, the information 220 related to the accessory 215 may also indicate a respective dielectric constant for each respective material, a dielectric constant for the composite or mix of materials, or both. A dielectric constant (e.g., Er) may be a measure of an ability for a material to store electrical energy that is the ratio between a materials permittivity to the permittivity of freespace or vacuum. In some examples, a value between two to four may be preferred for most scenarios of wireless communications (e.g., at a frequency of around 28 GHz). Further, the one or more properties of an accessory 215 included in the information 220 related to the accessory 215 may include a loss tangent (e.g., tan($\delta$)) associated with the accessory 215. A loss tangent may be a measurement of signal loss as a signal propagates down a transmission line. In some cases, different materials within the accessory 215 may have different loss tangents that may be used in conjunction to form a loss tangent for the accessory 215. As such, the loss tangent of the accessory 215 may capture how much of a signal loss there may be when the accessory 215 is installed on the UE 115-*a*. Additionally, or alternatively, the dielectric constant and the loss tangent of the accessory 215 may be based on the thickness of the accessory 215. For example, if the thickness of the accessory 215 changes by a few millimeters (e.g., a quantity of millimeters above a threshold) the values of the dielectric constant and the loss tangent of the accessory 215 may be changed.

In some examples, to indicate the one or more properties of the accessory 215 via the information 220 related to the accessory 215, the UE 115-a may query a database for the one or more properties of the accessory 215. For example, when the UE 115-a detects that an accessory 215 is installed or receives an indication that an accessory 215 is installed, the user of the UE 115-a may be prompted to input the type of accessory 215 that is installed. In some examples, the user of the UE 115-a may input the make, model, and manufacturer of the accessory 215 that is installed on the UE 115-a. As such, the UE 115-a may query a database of different accessory 215 types to obtain the one or more properties of the accessory 215 that is installed on the UE 115-a. In some cases, the database may be a database of different types of accessories 215. In some examples, the database may be stored directly on the UE 115-a. In some other examples, the database may be stored at the network entity 105-a. In yet other examples, the external database may be stored at a location that is accessible via the Internet, such as a cloud-based system. As such, the UE 115-a may transmit the query for the one or more properties of the accessory 215 to the network entity 105-a (which may, in some examples, route the query to an external database) and the UE 115-a may receive the one or more properties of the accessory 215 from the network entity 105-a via the communication link 125.

Further, as described herein, based on the type of accessory 215 installed on the UE 115-a and the one or more properties of the accessory 215, the UE 115-a may experience changes to the beamforming performance of the UE 115-a—e.g., based on changes to the signal coverage pattern caused by installation of the accessory 215 on the UE 115-a. In some examples, the UE 115-a may transmit such changes to the network entity 105-a via the information 220 related to the accessory 215. For example, the UE 115-a may indicate gains and losses of the effective isotropic radiated power (EIRP), effective isotropic sensitivity (EIS), or both via the information 220 related to the accessory 215 based on the accessory 215 being installed on the UE 115-a. In some cases, such gains and losses may also be dependent on the frequency of communications (e.g., 24-29 GHz low band communications vs. 37-48 GHz high band communications) and on a percentile point of interest over the spherical coverage of the UE 115-a. As such, the information 220 related to the accessory 215 may include an indication of one or more signal coverage metrics for the UE 115-a when the accessory 215 is installed on the UE 115-a.

Further, the UE 115-a may receive a message from the network entity 105-a that indicates whether a reported signal quality metric (e.g., an EIRP value) satisfies a signal coverage metric threshold. That is, the network entity 105-a may determine if the UE 115-a meets signal quality requirements for different percentile points. In some other cases, the UE 115-a may transmit, via the information 220 related to the accessory 215, a first indication of the one or more signal coverage metrics (e.g., EIRP/EIS measurements) for a first frequency range (e.g., the 24-29 GHz low band communications) and a second indication of the one or more signal coverage metrics for a second frequency range (e.g., the 37-48 GHz high band communications).

Additionally, or alternatively, based on the properties of the accessory 215, the performance of the UE 115-a may improve when the accessory 215 is installed on the UE 115-a. For example, depending on the materials of the accessory 215, having the accessory 215 installed on the UE

115-a may result in a more reliable matching of the network and a reduced return loss. However, whether such effects may be present for all frequencies (e.g., low band and high band within a frequency range) may be unknown. As such, the impact of the accessory 215 on the UE 115-a may be relatively random. Further, as described herein, the impact may also be based on the thickness of the accessory 215, the dielectric constant of the material mixes or composition of the accessory 215, the frequency range of the communications, interactions with the antenna panel 205 design, or any combination thereof.

In some cases, the accessory 215 may also have an impact on in-coverage signal regions, out-of-coverage signal regions, or both for the UE 115-a. For example, the UE 115-a may experience signal quality gains or losses for communications within in-coverage signal regions, out-of-coverage signal regions, or both. In some examples, the UE 115-a may experience a signal quality gain when the accessory 215 is installed on the UE 115-a. That is, the UE 115-a may have an increase in signal quality in an unexpected direction. Further, even though, the UE 115-a may experience both gains and losses within in-coverage signal regions and out-of-coverage signal regions there may not be any correlation or relationship between the directions that the UE 115-a experiences signal quality gains and losses.

In some other cases, based on the impact of the accessory 215 on the UE 115-a, the network entity 105-a may use the information 220 related to the accessory 215 to adapt or change an MCS. For example, based on the gains and losses of signal quality in the link margin (e.g., the different between a minimum expected power received by a receiver and the sensitivity of the receiver), the network entity 105-a may adapt the MCS. The MCS may be adapted such that a set of parameters for the communications between the UE 115-a and the network entity 105-a via the communication link 125 include the updates to the MCS.

In some examples, the UE 115-a may also indicate one or more beam property changes that are associated with the accessory 215 being installed on the UE 115-a via the information 220 related to the accessory 215. In some cases, a beam property change that may be an indication of a change of a beamwidth of a serving beam transmitted via at least one antenna element 210 of the antenna panel 205 over a frequency range. In some other cases, the beam property changes may include the gain distribution, loss distribution, or both for the out-of-coverage regions. That is, the UE 115-a may indicate, via the information 220, the gains and losses of signal quality in unintended beam directions.

As described herein, based on the UE 115-a determining that having the accessory 215 installed results in signal quality gains or losses in directions of the signal coverage pattern of the UE 115-a, the UE 115-a can improve a set of parameters that the UE 115-a communicates with the network entity 105-a in accordance with. That is, the UE 115-a may enhance the signal quality gains of the signal coverage pattern of the UE 115-a (e.g., the out-of-coverage regions of the signal coverage pattern of the UE 115-a). For example, the set of parameters for communication with the network entity 105-a may include a set of beam weights. As such, in some examples, the UE 115-a may configure or reconfigure the set of beam weights based on the one or more beam property changes. Further, the UE 115-a may reconfigure an analog beamforming codebook stored at the UE 115-a for communications with the network entity 105-a when the accessory 215 is installed on the UE 115-a. As such, the UE 115-a may load the analog beamforming codebook from the memory of the UE 115-a and select the beam weights that are reconfigured for the communications when the accessory 215 is installed on the UE 115-*a*.

In some other examples, the UE 115-*a* may use adaptive beam weights to enhance the signal quality gains in the out-of-coverage regions. To support the adaptive beam weights the UE 115-*a* may receive one or more reference signal resources 225 from the network entity 105-*a*. The UE 115-*a* may then use the one or more reference signal resources 225 to perform beam weight learning. In some cases, the network entity 105-*a* may configure and grant the one or more reference signal resources 225 for the UE 115-*a* to realize the enhance gains. Further, the network entity 105-*a* may also transmit a configuration of the one or more reference signal resources 225 to the UE 115-*a*. As such, the UE 115-*a* may adapt the beam weights based on receiving and using the one or more reference signal resources 225 which may be associated (e.g., configured for, granted for, or both) with adapting the beam weights.

As such, the UE 115-*a*, the network entity 105-*a*, or both may be capable of enhancing the communications between the UE 115-*a* and the network entity 105-*a* based on the information 220 related to the accessory 215. Therefore, the techniques of the present disclosure described herein provide the capability of improving communications within the wireless communications subsystem 200 when devices (e.g., UEs 115) have an accessory 215 installed. Further description of the techniques of the present disclosure may be described with reference to FIG. 3. Some other techniques of the present disclosure may be described with reference to FIG. 4 which may describe a calibration procedure between the UE 115-*a* and the network entity 105-*a* to further enhance the communications within the wireless communications subsystem 200.

Figure 3:
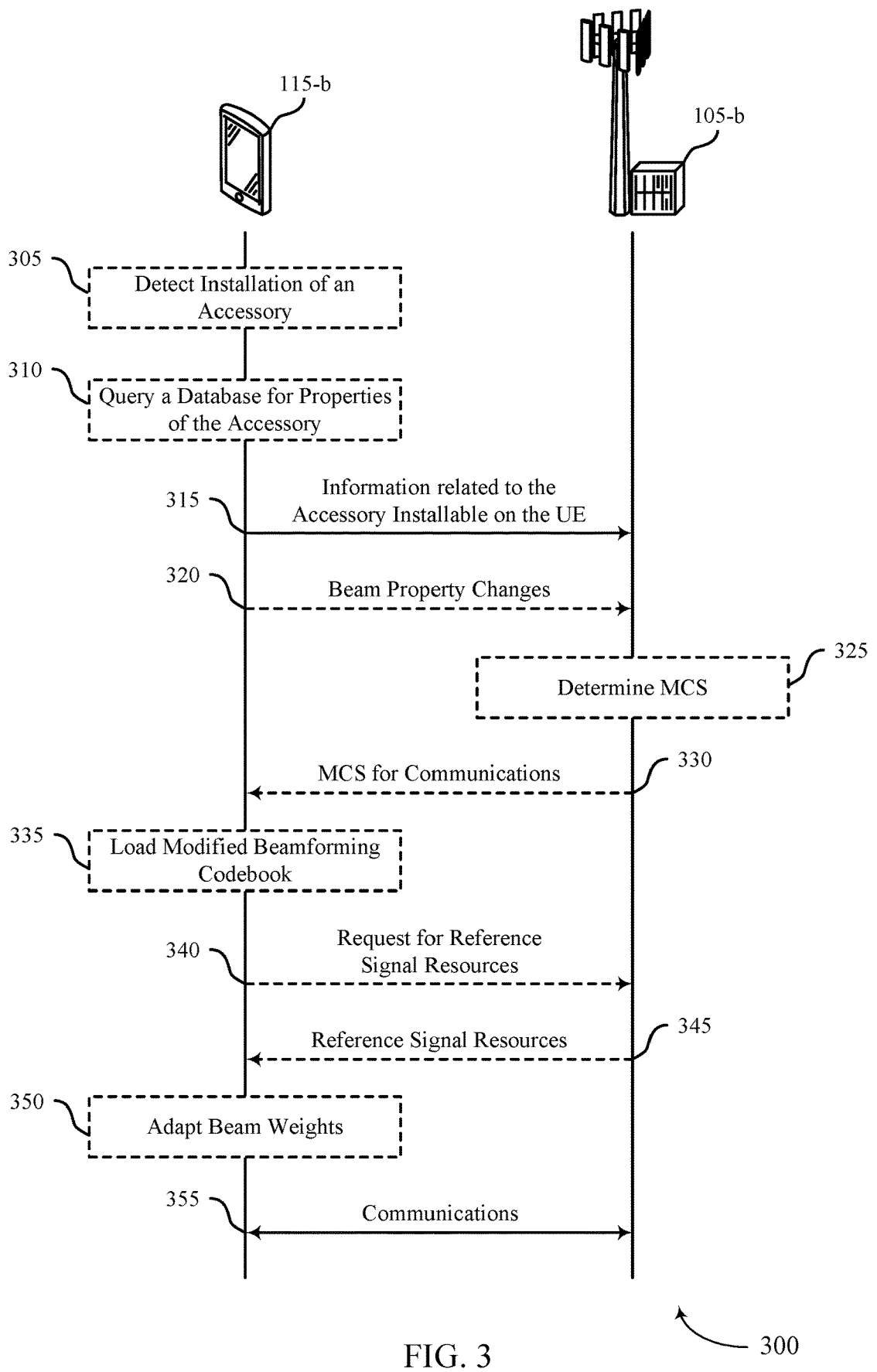
FIGS. 3 and 4 show examples of process flows that supports mitigating impacts of accessories on mmW communications in accordance with one or more aspects of the present disclosure.

FIG. 3 shows an example of a process flow 300 that supports mitigating impacts of accessories on mmW communications in accordance with one or more aspects of the present disclosure. In some examples, the process flow 300 may implement or be implemented by the wireless communications system 100 and/or the wireless communications subsystem 200. For example, the process flow 300 may include a UE 115-*b* and a network entity 105-*b*, which may be examples of devices described herein with reference to FIG. 1.

In the following description of the process flow 300, the operations between the UE 115-*b* and the network entity 105-*b* may be performed in different orders or at different times. Some operations may also be left out of the process flow 300, or other operations may be added. Although the UE 115-*b* and the network entity 105-*b* are shown performing the operations of the process flow 300, some aspects of some operations may also be performed by one or more other wireless devices.

At 305, in some cases, the UE 115-*b* may detect an installation of an accessory (e.g., a phone case) on the UE 115-*b*. For example, one or more sensors of the UE 115-*b* may detect that an accessory is installed on the UE 115-*b*. In some other cases, a user of the UE 115-*b* may toggle a setting, respond to a prompt, or input information into the settings of the UE 115-*b* to indicate that the accessory is installed on the UE 115-*b*. The installation of the accessory on the UE 115-*b* may be associated with an effect on a signal coverage pattern of the UE 115-*b*.

At 310, the UE 115-*b* may query a database for one or more properties of the accessory. For example, the UE 115-*b* may receive information from the user of the UE 115-*b* that indicates the type of accessory that is installed on the UE 115-*b*. As such, based on the type of accessory installed on the UE 115-*b* and querying the database, the UE 115-*b* may obtain, from the database, the one or more properties of the accessory installed on the UE 115-*b*. In some examples, the database may be stored at the UE 115-*b*, stored at the network entity 105-*b*, or an external device that is accessible via a data network communicatively coupled with the RAN. Further descriptions of the UE 115-*b* querying the database may be described elsewhere herein with reference to FIG. 2.

At 315, the UE 115-*b* may transmit, to the network entity 105-*b*, information related to the accessory installable on the UE 115-*b*. In some examples, the UE 115-*b* may transmit an indication of whether an accessory is installed on the UE 115-*b* via the information related to the accessory. In some cases, the indication of whether the accessory is installed on the UE 115-*b* may be a binary indication as described elsewhere herein. Additionally, or alternatively, the UE 115-*b* may transmit information that indicates the one or more properties of the accessory via the information related to the accessory. In some cases, the one or more properties of the accessory may include one or more materials included in the accessory, a dielectric constant associated with the accessory, a loss tangent associated with the accessory, a thickness of the accessory, or any combination thereof. Such one or more properties may be obtained from a database based on querying the database at 310.

In another example, the UE 115-*b* may transmit an indication of one or more signal coverage metrics for the UE 115-*b* associated with the installation of the accessory on the UE 115-*b* via the information related to the accessory. Further, the one or more signal coverage metrics may be based on the signal coverage pattern of the UE 115-*b* that is associated with the installation of the accessory on the UE 115-*b*. In some examples, the one or more signal coverage metrics may include an indication of an in-coverage signal coverage, an indication of an out-of-coverage signal coverage, or both. In some cases, the UE 115-*b* may also receive, from the network entity 105-*b*, a message indicating whether a signal coverage metric of the one or more signal coverage metric satisfies a corresponding signal coverage metric threshold (e.g., an EIRP threshold).

In some other examples, the UE 115-*b* may transmit a first indication of one or more signal coverage metrics for a first frequency range and associated with the installation of the accessory on the UE 115-*b* and a second indication of the one or more signal coverage metrics for a second frequency range and associated with the installation of the accessory on the UE 115-*b*. In some examples, the network entity 105-*b* may use the signal coverage metrics to determine whether the UE 115-*b* is capable of meeting signaling threshold (e.g., EIRP thresholds) at different percentile points.

Further, the UE 115-*b* may transmit the first indication and the second indication via the information related to the accessory. Further, the UE 115-*b* may transmit information that that indicates a type of the accessory, a model number of the accessory, a model indicator of the accessory, a manufacturer of the accessory, or any combination thereof, via the information related to the accessory. Additionally, or alternatively, the UE 115-*b* may transmit the information related to the accessory based on detecting that the accessory is installed on the UE 115-*b* at 305.

At 320, the UE 115-*b* may transmit, to the network entity 105-*b*, an indication of one or more beam property changes associated with the accessory being installed on the UE 115-*b*. In some examples, the beam property changes include respective changes in a beamwidth of one or more serving beams when the accessory is installed. Additionally, or alternatively, the beam property changes may include an indication of gains, losses, or both in an out-of-coverage area of a beam when the accessory is installed. In some cases, the UE 115-*b* may transmit the indication of the one or more beam property changes in a message separate from the information related to the accessory transmitted at 315. In some other cases, the UE 115-*b* may transmit the indication of the one or more beam property changes via the information related to the accessory transmitted at 315. Additionally, or alternatively, if the additional beam property changes occur while communicating with network entity 105-*b*, the UE 115-*b* may transmit an indication of such beam property changes to the network entity 105-*b*.

At 325, the network entity 105-*b* may determine an MCS for the UE 115-*b* to use for communications with the network entity 105-*b* via a communication link 125 between the UE 115-*b* and the network entity 105-*b*. In some examples, the network entity 105-*b* may determine the MCS based on the information related to the accessory installable on the UE 115-*b* that the UE 115-*b* transmitted at 315, based on the one or more beam property changes related to the accessory being installed on the UE 115-*b* that the UE 115-*b* transmitted at 315 and/or 320, or any combination thereof. At 330, the UE 115-*b* may receive, from the network entity 105-*b*, a message indicating an MCS for communication with the network entity 105-*b*. In some cases, the MCS may be based on the one or more signal coverage metrics indicated via the information related to the accessory at 315. Further, a set of parameters for the UE 115-*b* to communicate with the network entity 105-*b* may include the MCS indicated by the network entity 105-*b*.

At 335, the UE 115-*b* may load a different beamforming codebook—e.g., from memory of UE 115-*b*. In some examples, the different beamforming codebook is tailored to the particular accessory that is installed on the UE 115-*b*— e.g., based on a dielectric constant of the accessory, a loss tangent of the accessory, a change in signal metrics or beam properties caused by installation of the accessory. In some examples, the network entity 105-*b* sends a signal to the UE 115-*b* that triggers the UE 115-*b* to load the different beamforming codebook. Based on loading the different beamforming codebook, the UE 115-*b* may select an entry from the codebook based on the channel conditions between the UE 115-*b* and the network entity 105-*b* and configure the corresponding beam weights for subsequent communications.

At 340, the UE 115-*b* may request one or more reference signal resources from the network entity 105-*b*. For example, to adapt one or more beam weights based on an accessory being installed on the UE 115-*b*, the UE 115-*b* may perform one or more reference signal measurements on one or more requested reference signals. Therefore, at 345, the UE 115-*b* may receive, from the network entity 105-*b*, an indication of one or more reference signal resources based on the accessory being installed on the UE 115-*b*. In some cases, the one or more reference signal resources may be associated with (e.g., configured for, granted for, or both) adapting one or more beam weights at the UE 115-*b* where the set of parameters for communicating with the network entity 105-*b* may include the one or more beam weights.

At 350, the UE 115-*b* may adapt the one or more beam weights based on the one or more reference signal resources where the set of parameters may include the one or more adapted beam weights. In some cases, at 350, the UE 115-*b* may configure a set of beam weights at the UE 115-*b* based on the one or more beam property changes described herein that are associated with the accessory being installed on the UE 115-*b*. Further, the set of parameters for communication with the network entity 105-*b* may include the set of beam weights that are configured at 350.

At 355, the UE 115-*b* may communicate, with the network entity 105-*b*, in accordance with the set of parameters that are based on the effect of the accessory on the signal coverage pattern of the UE 115-*b*. As described elsewhere herein, the UE 115-*b* may communicate, with the network entity 105-*b*, in accordance with the set of parameters (e.g., MCS, adapted beam weights, reconfigured codebook) via the communication link 125 between the UE 115-*b* and the network entity 105-*b*.

Further descriptions of the techniques of the present disclosure may be described elsewhere herein. For example, to enhance the communications between the UE 115-*b* and the network entity 105-*b*, the UE 115-*b* and the network entity 105-*b* may undergo a calibration procedure associated with the accessory installed on the UE 115-*b*. Specifically, the calibration procedure may assist in the UE 115-*b*, the network entity 105-*b*, or both, determining the communications impact of the accessory that is installed on the UE 115-*b* to implement one or more techniques to reduce such communication impact. Such techniques of the present disclosure that describe such calibration procedure may be described elsewhere herein, including with reference to FIG. 4.

Figure 4:
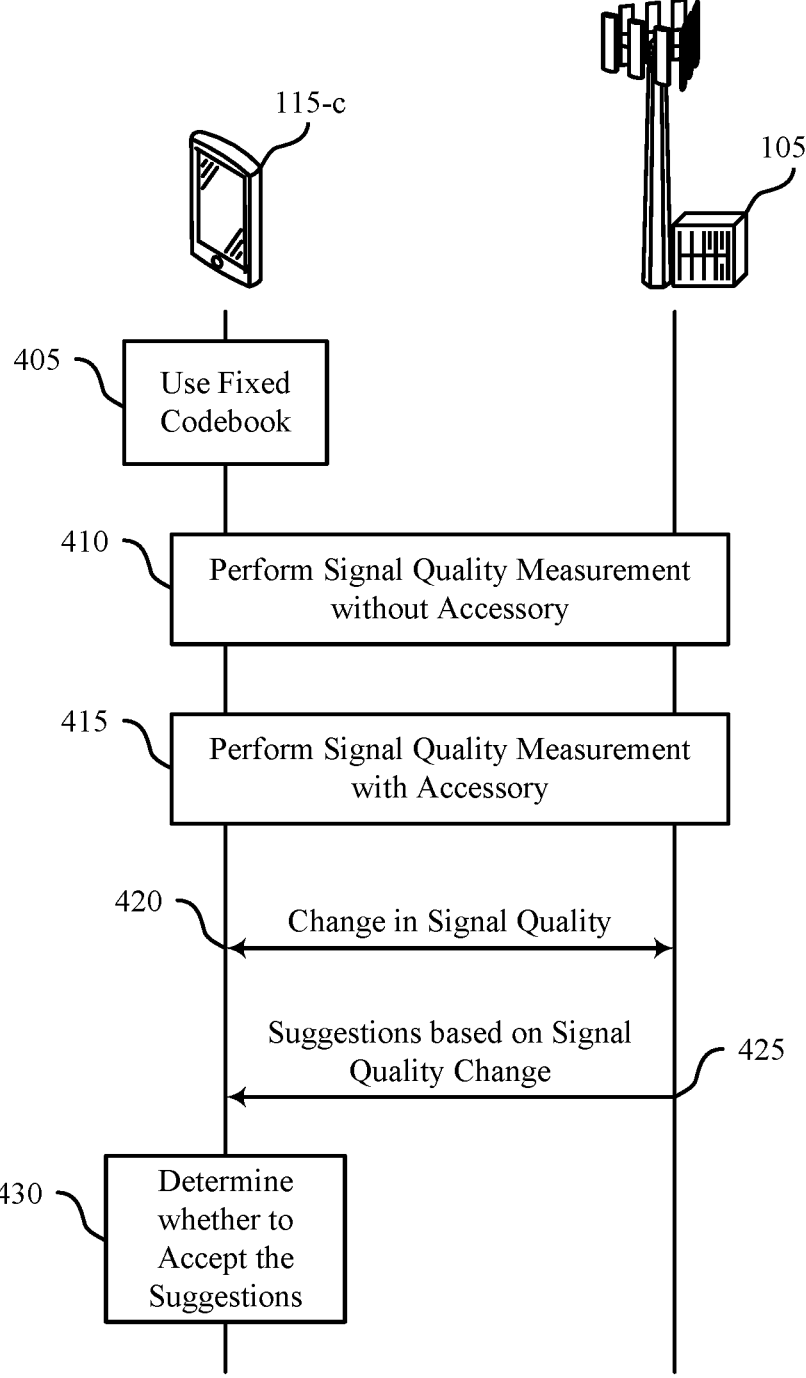

FIG. 4 shows an example of a process flow 400 that supports mitigating impacts of accessories on mmW communications in accordance with one or more aspects of the present disclosure. In some examples, the process flow 400 may implement or be implemented by the wireless communications system 100 and/or the wireless communications subsystem 200. For example, the process flow 400 may include a UE 115-*c* and a network entity 105-*c*, which may be examples of devices described herein with reference to FIG. 1.

In the following description of the process flow 400, the operations between the UE 115-*c* and the network entity 105-*c* may be performed in different orders or at different times. Some operations may also be left out of the process flow 400, or other operations may be added. Although the UE 115-*c* and the network entity 105-*c* are shown performing the operations of the process flow 400, some aspects of some operations may also be performed by one or more other wireless devices.

At 405, the UE 115-*c* may be configured to use a fixed codebook for beamforming. In some examples, the fixed codebook may be stored within the memory of the UE 115-*c* (e.g., radio-frequency integrated circuit (RFIC) chip memory) and the UE 115-*c* may load the codebook for use from the storage location within the memory of the UE 115-*c*. The fixed codebook may be designed based on the UE 115-*c* refraining from installing an accessory (e.g., a phone case) as described with reference to FIGS. 2 and 3. Further, the fixed codebook may be designed during a beam characterization phase in an off-field deployment. As such, the UE 115-*c* may use the fixed codebook for beamforming after being deployed.

At 410, the UE 115-*c*, the network entity 105-*c*, or both, may measure a first signal quality of the communication link 125 between the UE 115-*c* and the network entity 105-*c* while an accessory (e.g., a phone case) is not installed on the UE 115-*c* (e.g., before the accessory is installed on the UE 115-*c*). For example, the UE 115-*c* may perform signal quality measurements (e.g., L1-RSRP measurements, L1-reference signal receive quality (L1-RSRQ) measurements, or both) on reference signals received from the network entity 105-*c* via the communication link 125 between the UE 115-*c* and the network entity 105-*c* without an accessory being installed on the UE 115-*c*.

At 415, the UE 115-*c*, the network entity 105-*c*, or both, may measure a second signal quality of the communication link 125 between the UE 115-*c* and the network entity 105-*c* while an accessory is installed on the UE 115-*c*. For example, the UE 115-*c* may perform signal quality measurements on reference signals received from the network entity 105-*c* via the communication link 125 between the UE 115-*c* and the network entity 105-*c* while an accessory is installed on the UE 115-*c*.

At 420, in some cases, the UE 115-*c* may transmit, to the network entity 105-*c*, a message indicating a difference between the first signal quality measurement and the second signal quality measurement. Such difference may indicate a change in signal quality of the communication link 125 between the UE 115-*c* and the network entity 105-*c* when an accessory is installed on the UE 115-*c*. In some other cases, the UE 115-*c* may receive, from the network entity 105-*c*, a message that includes an indication of a signal quality of the communication link 125 between the UE 115-*c* and the network entity 105-*c* when the accessory is installed on the UE 115-*c*. Additionally, or alternatively, the UE 115-*c* may receive, from the network entity 105-*c*, a message indicating a change in the signal quality of the communication link 125 between the UE 115-*c* and the network entity 105-*c* when an accessory is installed on the UE 115-*c*. Based on performing signal quality measurements with and without an accessory being installed on the UE 115-*c*, the UE 115-*c* may determine whether the accessory should remain installed on the UE 115-*c*. In some cases, the UE 115-*c* may determine that the accessory should be removed, and the UE 115-*c* may prompt the user of the UE 115-*c* with a notification. In some examples, the notification may indicate that the change in the signal quality of the communication link 125 between the UE 115-*c* and the network entity 105-*c* when an accessory is installed on the UE 115-*c* is above a signal quality change threshold. In some other examples, the notification may indicate that the installation of the accessory on the UE 115-*c* has degraded the reliability and effectiveness of the communications between the UE 115-*c* and the network entity 105-*c*.

At 425, the network entity 105-*c* may transmit, to the UE 115-*c*, one or more suggestions related to the installation of the accessory on the UE 115-*c*. In some cases, the network entity 105-*c* may transmit the one or more suggestions based on the network entity 105-*c* receiving, from the UE 115-*c*, the indication of the change in the signal quality of the communication link 125 between the UE 115-*c* and the network entity 105-*c* when an accessory is installed on the UE 115-*c*. In some other cases, the network entity 105-*c* may determine the change in the signal quality based on performing one or more signal quality measurements at 410 and 415.

In some examples, the one or more suggestions may include an indication of whether the UE 115-*c* should keep the accessory installed, an indication to change to a different MCS based on the accessory being installed on the UE 115-*c*, an indication to perform a beam switch based on the accessory being installed on the UE 115-*c*, or any combination thereof. In some cases, the indication of whether the UE 115-*c* should keep the accessory installed may be a binary indication. For example, a bit with a value of 1 may indicate that the network entity 105-*c* suggests keeping the accessory installed on the UE 115-*c* and a value of 0 may indicate that the network entity 105-*c* suggests that the accessory be removed from the UE 115-*c* (e.g., be uninstalled from the UE 115-*c*). Further, in some cases, the indication to change the MCS may be based on the network entity 105-*c* determining a loss in the signal quality of the communication link 125 between the UE 115-*c* and the network entity 105-*c* when an accessory is installed on the UE 115-*c*. As such, a change or adaption to the MCS may improve the signal quality and the communications of the communication link 125 between the UE 115-*c* and the network entity 105-*c* when an accessory is installed on the UE 115-*c*. In some other cases, the network entity 105-*c* may indicate to change the MCS based on the change in signal quality received or determined at 420 indicating an increase in signal quality when an accessory is installed on the UE 115-*c*. As such, the network entity 105-*c* may suggest the UE 115-*c* to change to a different MCS to reduce the power consumption of the UE 115-*c*. Further, the network entity 105-*c* may suggest for the UE 115-*c* to switch to a different beam (e.g., via a beam switch procedure) to improve the link quality of the communication link 125 between the UE 115-*c* and the network entity 105-*c* when an accessory is installed on the UE 115-*c*.

At 430, the UE 115-*c* may determine whether to accept any of the suggestion from the network entity 105-*c*. In some examples, the UE 115-*c* may accept a subset of the suggestions and deny the others, accept all the suggestions, or deny all the suggestions. In some cases, the UE 115-*c* may also prompt the user of the UE 115-*c* to assist in determining whether to accept a suggestion from the network entity 105-*c*. For example, if the network entity 105-*c* suggests the UE 115-*c* to remove accessory, the UE 115-*c* may display a notification of such suggestion to the user of the UE 115-*c*. In some examples, the user of the UE 115-*c* may respond to the notification by removing the accessory from the UE 115-*c* and, in some examples, indicating the removal via the settings of the UE 115-*c*. In some other cases, the user of the UE 115-*c* may reject the suggestion and keep the accessory installed on the UE 115-*c*. Additionally, or alternatively, the user of the UE 115-*c* may remove the accessory (e.g., a first accessory or phone case) that is installed on the UE 115-*c* and install a different accessory (e.g., a second accessory or phone case) on the UE 115-*c* based on receiving the notification. For example, the second accessory may have a different set of properties which may improve the link quality of the communication link 125 between the UE 115-*c* and the network entity 105-*c* when an accessory is installed on the UE 115-*c*. Further, in some cases, the UE 115-*c* may transmit a message to the network entity 105-*c* to indicate which (if any) suggestions the UE 115-*c* is accepting. In some other cases, the UE 115-*c* may accept one or more of the suggestions and refrain from informing the network entity 105-*c* to save power and reduce signaling overhead.

Such calibration procedure illustrated via the process flow 400 may allow for the UE 115-*c*, the network entity 105-*c*, or both to make determinations on the impact of an accessory on the signal coverage of the UE 115-*c*. Based on such determinations, the UE 115-*c*, the network entity 105-*c*, or both wireless devices may adapt the one or more parameters for communicating via the communication link 125 between the UE 115-*c* and the network entity 105-*c*. Further descriptions of the techniques of the present disclosure may be described with reference to FIGS. 5 through 17.

Figure 5:
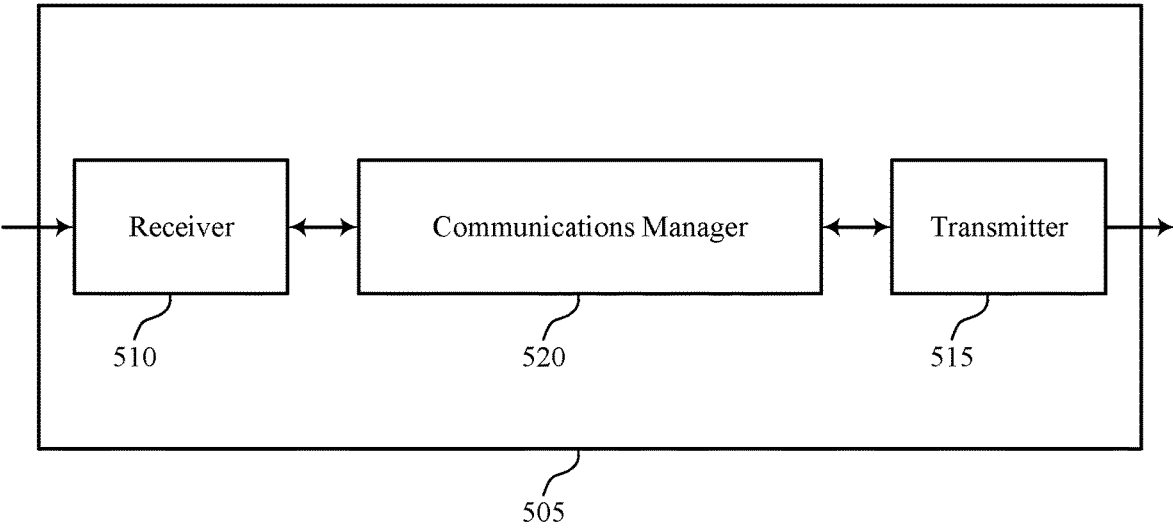
FIGS. 5 and 6 show block diagrams of devices that support mitigating impacts of accessories on mmW communications in accordance with one or more aspects of the present disclosure.

FIG. 5 shows a block diagram 500 of a device 505 that supports mitigating impacts of accessories on mmW communications in accordance with one or more aspects of the present disclosure. The device 505 may be an example of aspects of a UE 115 as described herein. The device 505 may include a receiver 510, a transmitter 515, and a communi-
cations manager 520. The device 505, or one or more
components of the device 505 (e.g., the receiver 510, the
transmitter 515, and the communications manager 520), may
include at least one processor, which may be coupled with
at least one memory, to, individually or collectively, support
or enable the described techniques. Each of these compo-
nents may be in communication with one another (e.g., via
one or more buses).

The receiver 510 may provide a means for receiving
information such as packets, user data, control information,
or any combination thereof associated with various infor-
mation channels (e.g., control channels, data channels, infor-
mation channels related to mitigating impacts of accessories
on mmW communications). Information may be passed on
to other components of the device 505. The receiver 510
may utilize a single antenna or a set of multiple antennas.

The transmitter 515 may provide a means for transmitting
signals generated by other components of the device 505.
For example, the transmitter 515 may transmit information
such as packets, user data, control information, or any
combination thereof associated with various information
channels (e.g., control channels, data channels, information
channels related to mitigating impacts of accessories on
mmW communications). In some examples, the transmitter
515 may be co-located with a receiver 510 in a transceiver
module. The transmitter 515 may utilize a single antenna or
a set of multiple antennas.

The communications manager 520, the receiver 510, the
transmitter 515, or various combinations thereof or various
components thereof may be examples of means for perform-
ing various aspects of mitigating impacts of accessories on
mmW communications as described herein. For example,
the communications manager 520, the receiver 510, the
transmitter 515, or various combinations or components
thereof may be capable of performing one or more of the
functions described herein.

In some examples, the communications manager 520, the
receiver 510, the transmitter 515, or various combinations or
components thereof may be implemented in hardware (e.g.,
in communications management circuitry). The hardware
may include at least one of a processor, a digital signal
processor (DSP), a central processing unit (CPU), an appli-
cation-specific integrated circuit (ASIC), a field-program-
mable gate array (FPGA) or other programmable logic
device, a microcontroller, discrete gate or transistor logic,
discrete hardware components, or any combination thereof
configured as or otherwise supporting, individually or col-
lectively, a means for performing the functions described in
the present disclosure. In some examples, at least one
processor and at least one memory coupled with the at least
one processor may be configured to perform one or more of
the functions described herein (e.g., by one or more proces-
sors, individually or collectively, executing instructions
stored in the at least one memory).

Additionally, or alternatively, the communications man-
ager 520, the receiver 510, the transmitter 515, or various
combinations or components thereof may be implemented in
code (e.g., as communications management software)
executed by at least one processor. If implemented in code
executed by at least one processor, the functions of the
communications manager 520, the receiver 510, the trans-
mitter 515, or various combinations or components thereof
may be performed by a general-purpose processor, a DSP, a
CPU, a graphics processing unit (GPU), a neural processing
unit (NPU), an ASIC, an FPGA, a microcontroller, or any
combination of these or other programmable logic devices (e.g., configured as or otherwise supporting, individually or
collectively, a means for performing the functions described
in the present disclosure).

In some examples, the communications manager 520 may
be configured to perform various operations (e.g., receiving,
obtaining, monitoring, outputting, transmitting) using or
otherwise in cooperation with the receiver 510, the trans-
mitter 515, or both. For example, the communications
manager 520 may receive information from the receiver 510,
send information to the transmitter 515, or be integrated in
combination with the receiver 510, the transmitter 515, or
both to obtain information, output information, or perform
various other operations as described herein.

The communications manager 520 may support wireless
communications in accordance with examples as disclosed
herein. For example, the communications manager 520 is
capable of, configured to, or operable to support a means for
transmitting, to a network entity, information related to an
accessory installable on the UE, where installation of the
accessory on the UE is associated with an effect on a signal
coverage pattern of the UE. The communications manager
520 is capable of, configured to, or operable to support a
means for communicating, with the network entity, in accor-
dance with a set of parameters that are based on the effect of
the accessory on the signal coverage pattern of the UE.

By including or configuring the communications manager
520 in accordance with examples as described herein, the
device 505 (e.g., at least one processor controlling or oth-
erwise coupled with the receiver 510, the transmitter 515,
the communications manager 520, or a combination thereof)
may support techniques for improving communications
when accessories are installed on UEs for more efficient
utilization of communication resources.

Figure 6:
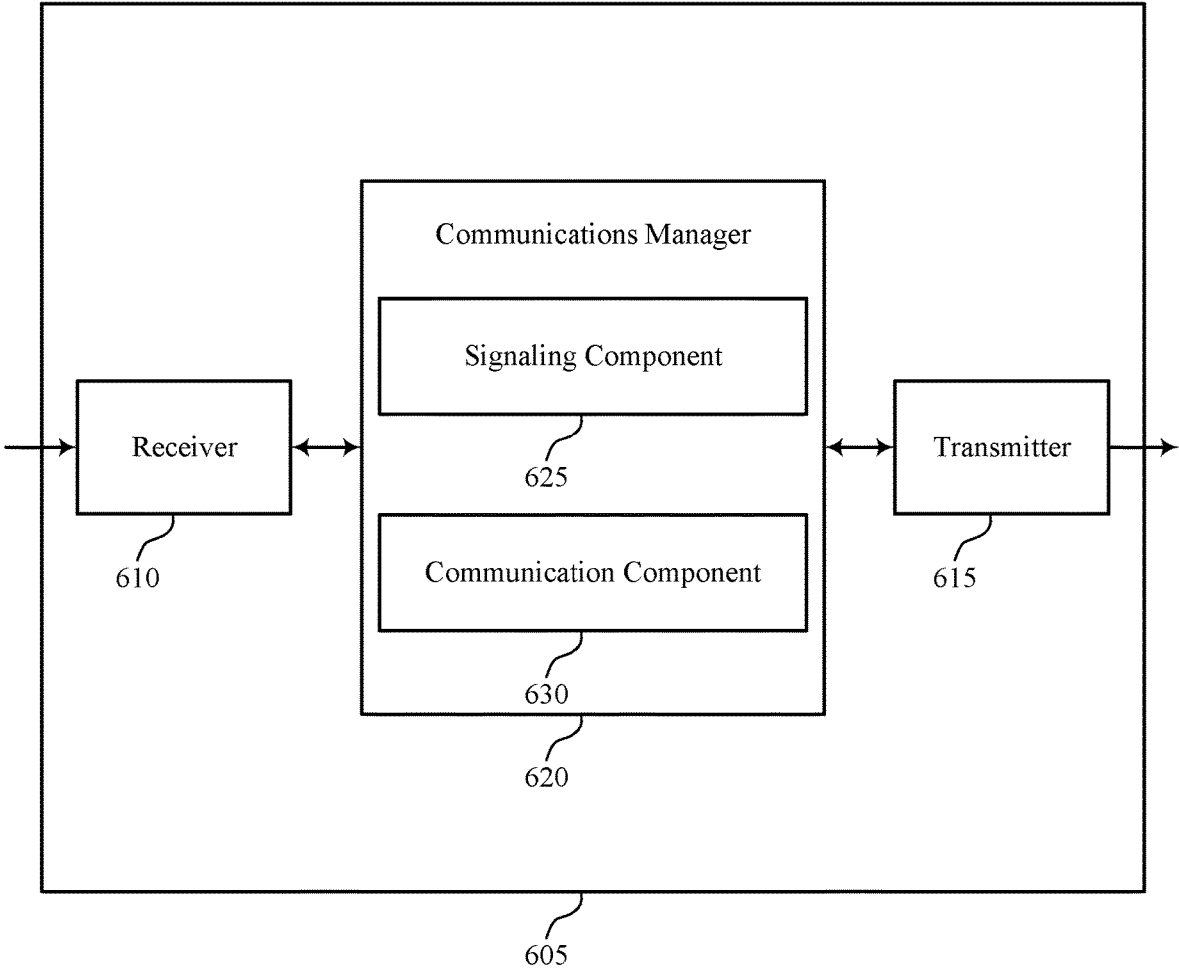

FIG. 6 shows a block diagram 600 of a device 605 that
supports mitigating impacts of accessories on mmW com-
munications in accordance with one or more aspects of the
present disclosure. The device 605 may be an example of
aspects of a device 505 or a UE 115 as described herein. The
device 605 may include a receiver 610, a transmitter 615,
and a communications manager 620. The device 605, or one
or more components of the device 605 (e.g., the receiver
610, the transmitter 615, and the communications manager
620), may include at least one processor, which may be
coupled with at least one memory, to support the described
techniques. Each of these components may be in commu-
nication with one another (e.g., via one or more buses).

The receiver 610 may provide a means for receiving
information such as packets, user data, control information,
or any combination thereof associated with various infor-
mation channels (e.g., control channels, data channels, infor-
mation channels related to mitigating impacts of accessories
on mmW communications). Information may be passed on
to other components of the device 605. The receiver 610
may utilize a single antenna or a set of multiple antennas.

The transmitter 615 may provide a means for transmitting
signals generated by other components of the device 605.
For example, the transmitter 615 may transmit information
such as packets, user data, control information, or any
combination thereof associated with various information
channels (e.g., control channels, data channels, information
channels related to mitigating impacts of accessories on
mmW communications). In some examples, the transmitter
615 may be co-located with a receiver 610 in a transceiver
module. The transmitter 615 may utilize a single antenna or
a set of multiple antennas.

The device 605, or various components thereof, may be
an example of means for performing various aspects of mitigating impacts of accessories on mmW communications as described herein. For example, the communications manager 620 may include an signaling component 625 a communication component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The signaling component 625 is capable of, configured to, or operable to support a means for transmitting, to a network entity, information related to an accessory installable on the UE, where installation of the accessory on the UE is associated with an effect on a signal coverage pattern of the UE. The communication component 630 is capable of, configured to, or operable to support a means for communicating, with the network entity, in accordance with a set of parameters that are based on the effect of the accessory on the signal coverage pattern of the UE.

Figure 7:
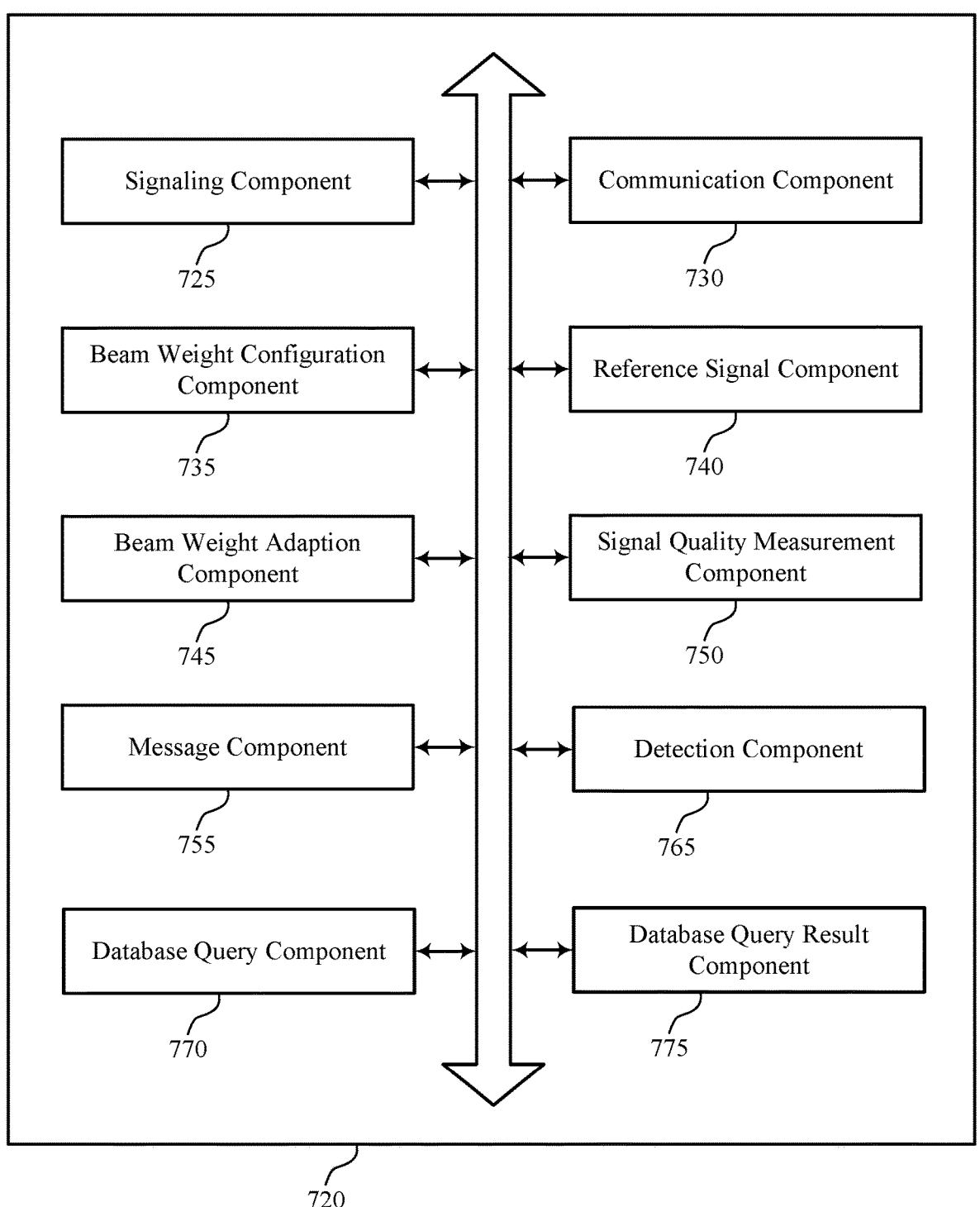
FIG. 7 shows a block diagram of a communications manager that supports mitigating impacts of accessories on mmW communications in accordance with one or more aspects of the present disclosure.

FIG. 7 shows a block diagram 700 of a communications manager 720 that supports mitigating impacts of accessories on mmW communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of mitigating impacts of accessories on mmW communications as described herein. For example, the communications manager 720 may include an signaling component 725, a communication component 730, a beam weight configuration component 735, a reference signal component 740, a beam weight adaption component 745, a signal quality measurement component 750, a message component 755, a detection component 765, a database query component 770, a database query result component 775, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The signaling component 725 is capable of, configured to, or operable to support a means for transmitting, to a network entity, information related to an accessory installable on the UE, where installation of the accessory on the UE is associated with an effect on a signal coverage pattern of the UE. The communication component 730 is capable of, configured to, or operable to support a means for communicating, with the network entity, in accordance with a set of parameters that are based on the effect of the accessory on the signal coverage pattern of the UE.

In some examples, to support transmitting the information related to the accessory, the signaling component 725 is capable of, configured to, or operable to support a means for transmitting an indication of one or more beam property changes associated with the accessory being installed on the UE.

In some examples, to support transmitting the information related to the accessory, the signaling component 725 is capable of, configured to, or operable to support a means for transmitting an indication of whether the accessory is installed on the UE.

In some examples, to support transmitting the information related to the accessory, the signaling component 725 is capable of, configured to, or operable to support a means for transmitting information that indicates one or more properties of the accessory.

In some examples, the one or more properties of the accessory includes one or more materials included in the accessory, a dielectric constant associated with the accessory, a loss tangent associated with the accessory, a thickness of the accessory, or any combination thereof.

In some examples, the database query component 770 is capable of, configured to, or operable to support a means for querying a database for the one or more properties of the accessory. In some examples, the database query result component 775 is capable of, configured to, or operable to support a means for obtaining, from the database, the one or more properties of the accessory based on querying the database.

In some examples, to support transmitting the information related to the accessory, the signaling component 725 is capable of, configured to, or operable to support a means for transmitting an indication of one or more signal coverage metrics for the UE associated with the installation of the accessory on the UE, where the one or more signal coverage metrics are based on the signal coverage pattern of the UE associated with the installation of the accessory on the UE.

In some examples, the message component 755 is capable of, configured to, or operable to support a means for receiving, from the network entity, a message indicating whether a signal coverage metric of the one or more signal coverage metrics satisfies a corresponding signal coverage metric threshold.

In some examples, the one or more signal coverage metrics includes an indication of an in-coverage signal coverage, an indication of an out-of-coverage signal coverage, or both.

In some examples, the message component 755 is capable of, configured to, or operable to support a means for receiving, from the network entity, a message indicating a modulation and coding scheme that is based on the one or more signal coverage metrics indicated via the information related to the accessory, where the set of parameters for communicating with the network entity includes the modulation and coding scheme.

In some examples, to support transmitting the information related to the accessory, the signaling component 725 is capable of, configured to, or operable to support a means for transmitting a first indication of one or more signal coverage metrics for a first frequency range and associated with the installation of the accessory on the UE and a second indication of the one or more signal coverage metrics for a second frequency range and associated with the installation of the accessory on the UE.

In some examples, the beam weight configuration component 735 is capable of, configured to, or operable to support a means for configuring a set of beam weights at the UE based on one or more beam property changes associated with the accessory being installed on the UE, where the set of parameters for communicating with the network entity includes the set of beam weights.

In some examples, the beam weight configuration component 735 is capable of, configured to, or operable to support a means for loading, from memory of the UE and based on the one or more beam property changes associated with the accessory being installed on the UE, a codebook associated with the accessory being installed on the UE. In some examples, the beam weight configuration component 735 is capable of, configured to, or operable to support a means for selecting, from the codebook, the configured set of beam weights.

In some examples, the reference signal component 740 is capable of, configured to, or operable to support a means for receiving, from the network entity, an indication of one or more reference signal resources based on the accessory being installed on the UE, the one or more reference signal resources associated with adapting one or more beam weights at the UE, where the set of parameters for communicating with the network entity includes the one or more beam weights. In some examples, the beam weight adaption component 745 is capable of, configured to, or operable to support a means for adapting the one or more beam weights based on the one or more reference signal resources, where the set of parameters includes the one or more adapted beam weights.

In some examples, the signal quality measurement component 750 is capable of, configured to, or operable to support a means for performing a first signal quality measurement on a communication link between the UE and the network entity before the accessory is installed on the UE. In some examples, the signal quality measurement component 750 is capable of, configured to, or operable to support a means for performing a second signal quality measurement of the communication link while the accessory is installed on the UE. In some examples, the message component 755 is capable of, configured to, or operable to support a means for transmitting, to the network entity, a message indicating a difference between the first signal quality measurement and the second signal quality measurement.

In some examples, the message component 755 is capable of, configured to, or operable to support a means for receiving, from the network entity, a message including an indication of a signal quality of a communication link between the UE and the network entity when the accessory is installed on the UE.

In some examples, to support receiving the message indicating the signal quality of the communication link, the message component 755 is capable of, configured to, or operable to support a means for receiving, from the network entity, an indication of whether to keep the accessory installed on the UE, an indication of a change to a modulation and coding scheme that is based on the accessory being installed on the UE, an indication to switch beams that is based on the accessory being installed on the UE, or any combination thereof. In some examples, to support receiving the message indicating the signal quality of the communication link, the message component 755 is capable of, configured to, or operable to support a means for transmitting, to the network entity, a second message indicating of whether the accessory remains installed on the UE, whether the modulation and coding scheme is changed, whether the beams are switched, or any combination thereof.

In some examples, to support transmitting the information related to the accessory, the signaling component 725 is capable of, configured to, or operable to support a means for transmitting information that indicates a type of the accessory, a model number of the accessory, a model indicator of the accessory, a manufacturer of the accessory, or any combination thereof.

In some examples, the detection component 765 is capable of, configured to, or operable to support a means for detecting, by the UE, that the accessory is installed on the UE, where the information related to the accessory is transmitted based on the detecting.

Figure 8:
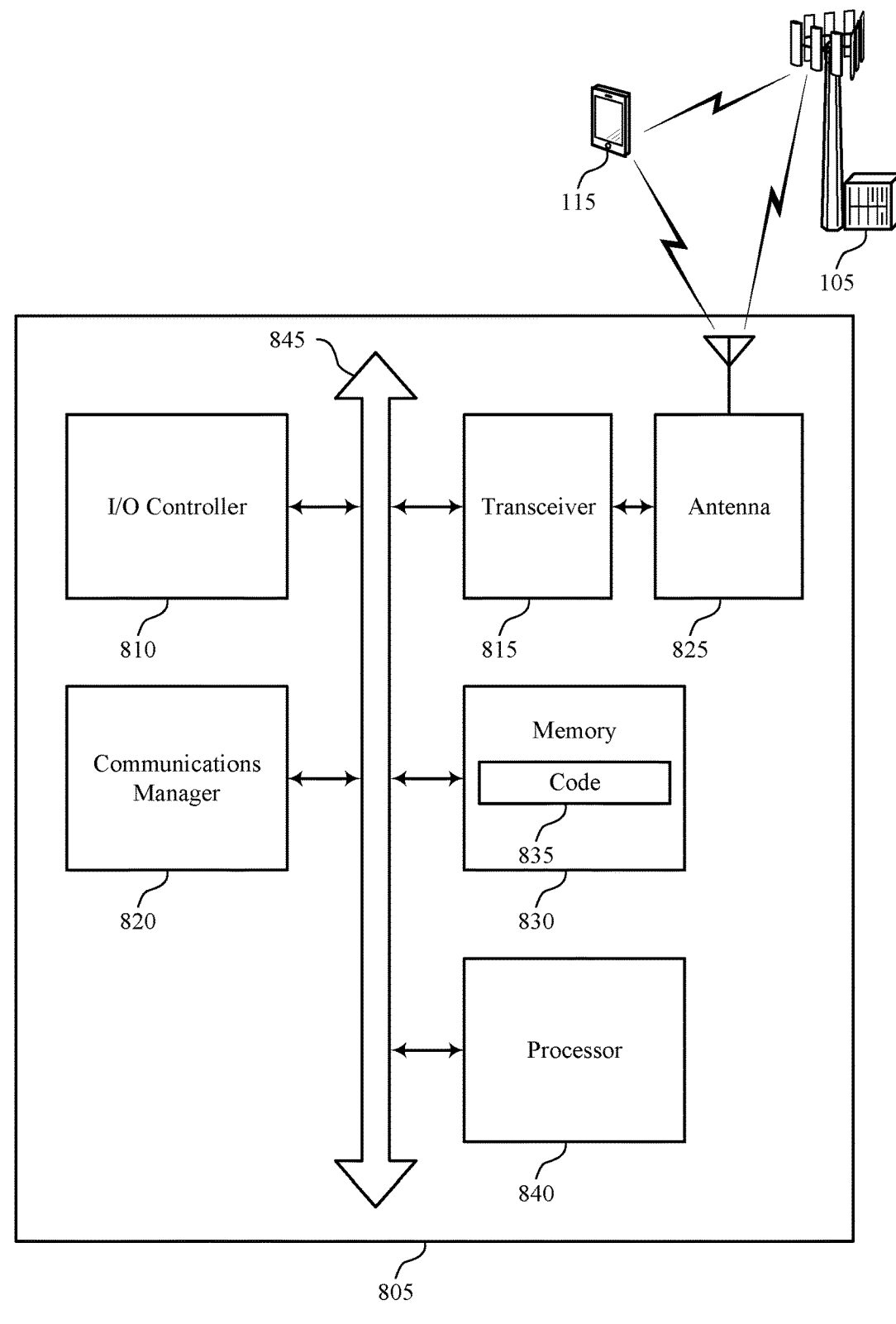
FIG. 8 shows a diagram of a system including a device that supports mitigating impacts of accessories on mmW communications in accordance with one or more aspects of the present disclosure.

FIG. 8 shows a diagram of a system 800 including a device 805 that supports mitigating impacts of accessories on mmW communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a GPU, a NPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting mitigating impacts of accessories on mmW communications). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for transmitting, to a network entity, information related to an accessory installable on the UE, where installation of the accessory on the UE is associated with an effect on a signal coverage pattern of the UE. The communications manager 820 is capable of, configured to, or operable to support a means for communicating, with the network entity, in accordance with a set of parameters that are based on the effect of the accessory on the signal coverage pattern of the UE.

By including or configuring the communications manager 820 in accordance with examples as described herein, the device 805 may support techniques for improving communications when accessories are installed on UEs for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of mitigating impacts of accessories on mmW communications as described herein, or the at least one processor 840 and the at least one memory 830 may be otherwise configured to, individually or collectively, perform or support such operations.

Figure 9:
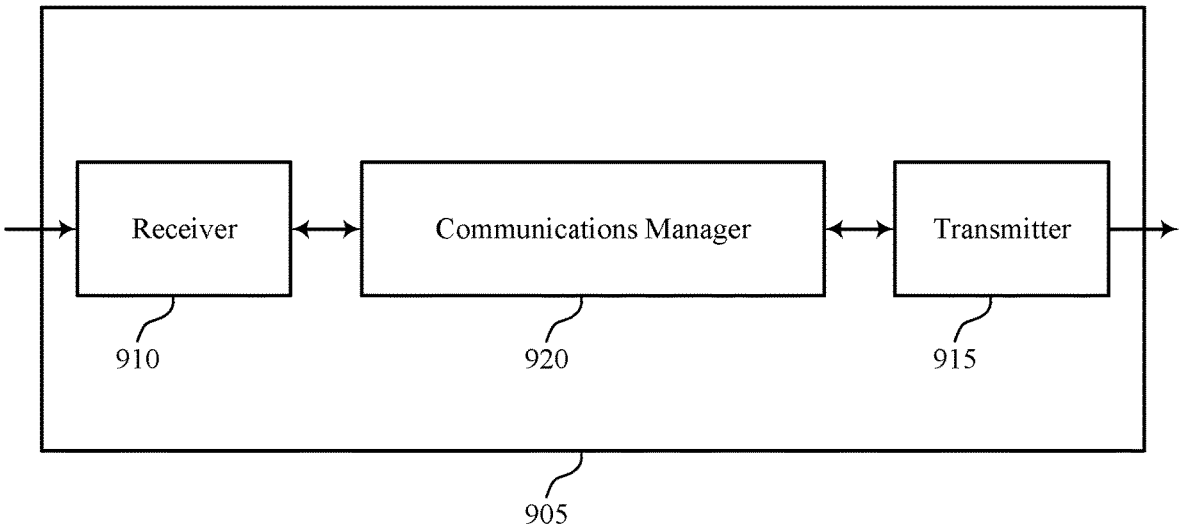
FIGS. 9 and 10 show block diagrams of devices that support mitigating impacts of accessories on mmW communications in accordance with one or more aspects of the present disclosure.

FIG. 9 shows a block diagram 900 of a device 905 that supports mitigating impacts of accessories on mmW communications in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of mitigating impacts of accessories on mmW communications as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, a GPU, an NPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software) executed by at least one processor. If implemented in code executed by at least one processor, the functions of the communications manager 920, the receiver 910, the transmitter 915, or various combinations or components thereof may be performed by a general-purpose processor, a DSP, a CPU, a GPU, an NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving, from a UE, information related to an accessory installable on the UE, where installation of the accessory on the UE is associated with an effect on a signal coverage pattern of the UE. The communications manager 920 is capable of, configured to, or operable to support a means for communicating, with the UE, in accordance with a set of parameters that are based on the effect of the accessory on the signal coverage pattern of the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for improving communications when accessories are installed on UEs for more efficient utilization of communication resources.

Figure 10:
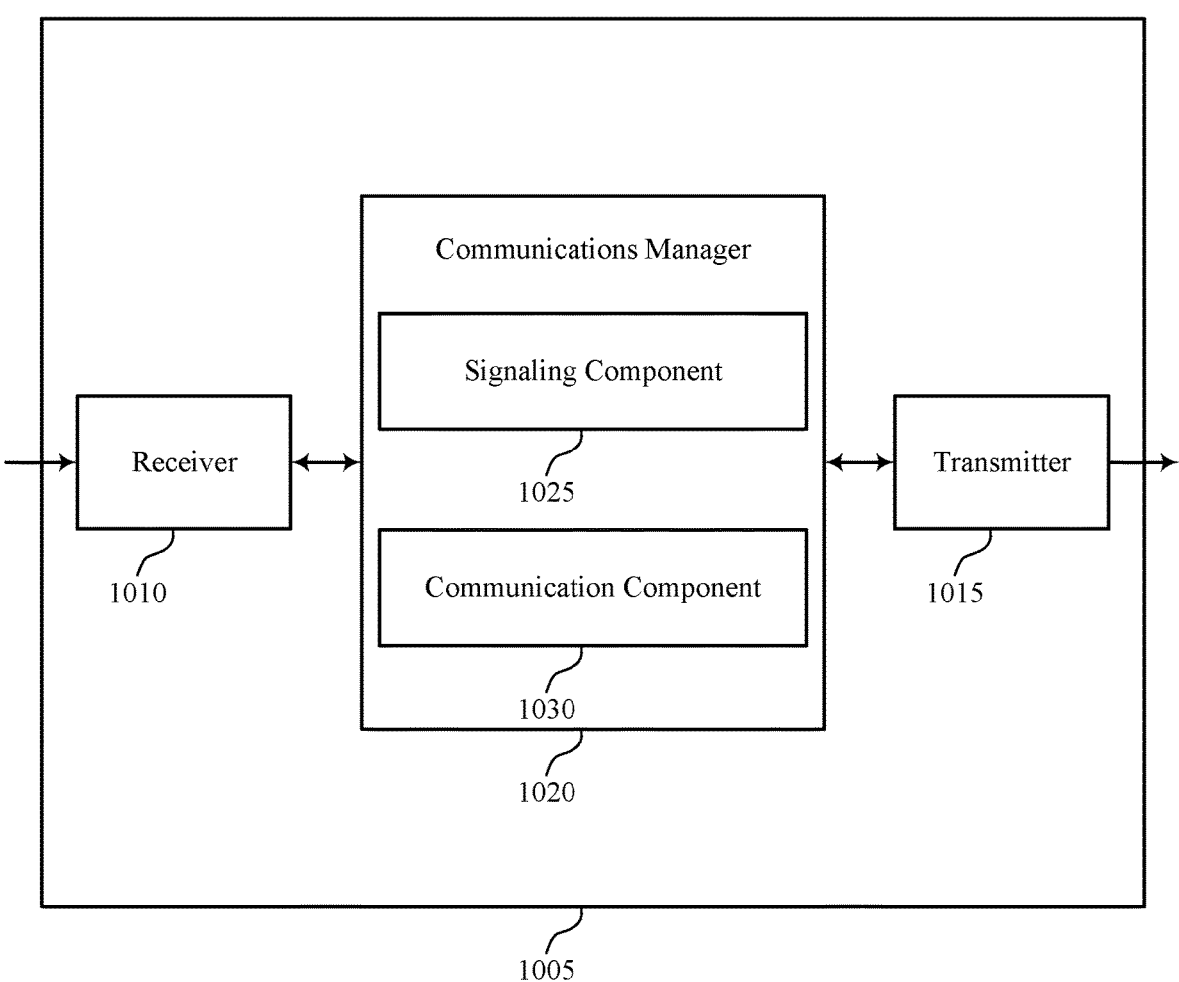

FIG. 10 shows a block diagram 1000 of a device 1005 that supports mitigating impacts of accessories on mmW communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of mitigating impacts of accessories on mmW communications as described herein. For example, the communications manager 1020 may include an signaling component 1025 a communication component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The signaling component 1025 is capable of, configured to, or operable to support a means for receiving, from a UE, information related to an accessory installable on the UE, where installation of the accessory on the UE is associated with an effect on a signal coverage pattern of the UE. The communication component 1030 is capable of, configured to, or operable to support a means for communicating, with the UE, in accordance with a set of parameters that are based on the effect of the accessory on the signal coverage pattern of the UE.

Figure 11:
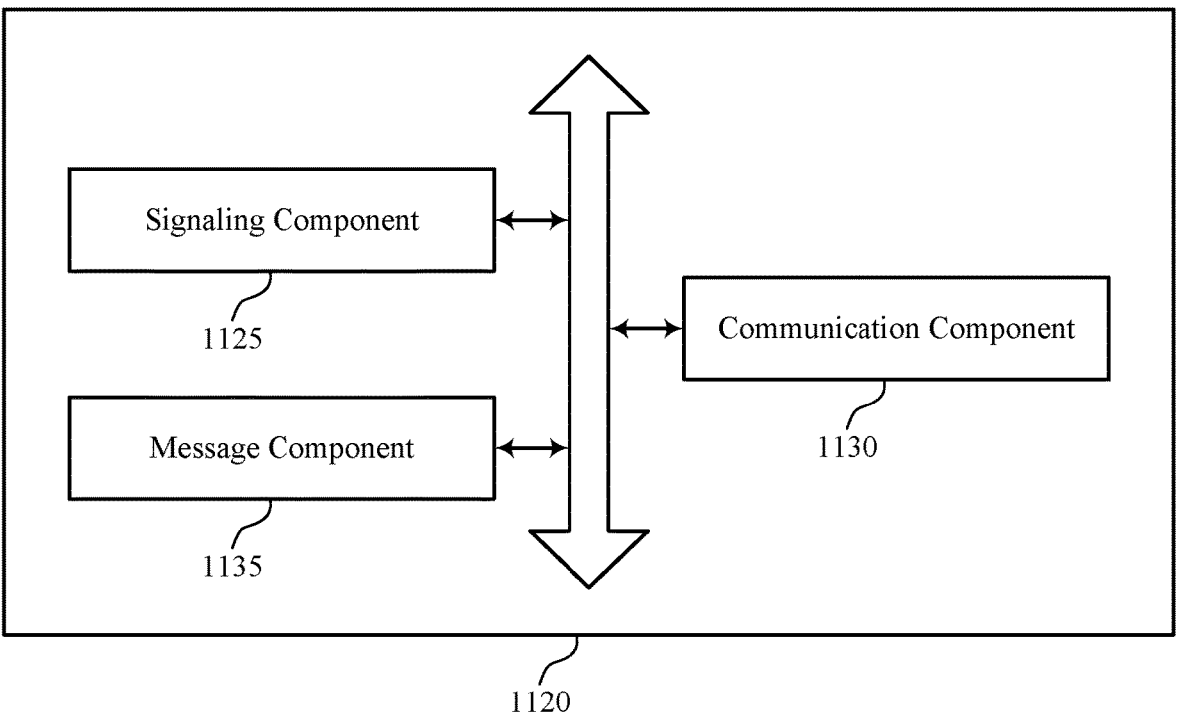
FIG. 11 shows a block diagram of a communications manager that supports mitigating impacts of accessories on mmW communications in accordance with one or more aspects of the present disclosure.

FIG. 11 shows a block diagram 1100 of a communications manager 1120 that supports mitigating impacts of accessories on mmW communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of mitigating impacts of accessories on mmW communications as described herein. For example, the communications manager 1120 may include an signaling component 1125, a communication component 1130, a message component 1135, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The signaling component 1125 is capable of, configured to, or operable to support a means for receiving, from a UE, information related to an accessory installable on the UE, where installation of the accessory on the UE is associated with an effect on a signal coverage pattern of the UE. The communication component 1130 is capable of, configured to, or operable to support a means for communicating, with the UE, in accordance with a set of parameters that are based on the effect of the accessory on the signal coverage pattern of the UE.

In some examples, to support receiving the information related to the accessory, the signaling component 1125 is capable of, configured to, or operable to support a means for receiving an indication of one or more signal coverage metrics for the UE associated with the installation of the accessory on the UE, where the one or more signal coverage metrics are based on the signal coverage pattern of the UE associated with the installation of the accessory on the UE.

In some examples, the signaling component 1125 is capable of, configured to, or operable to support a means for transmitting, to the UE, a message indicating whether a signal coverage metric of the one or more signal coverage metrics satisfies a corresponding signal coverage metric threshold.

In some examples, the signaling component 1125 is capable of, configured to, or operable to support a means for transmitting, to the UE, a message indicating a modulation and coding scheme that is based on the one or more signal coverage metrics indicated via the information related to the accessory, where the set of parameters for communicating with the network entity includes the modulation and coding scheme.

In some examples, the message component 1135 is capable of, configured to, or operable to support a means for transmitting, to the UE, a message including an indication of a signal quality of a communication link between the UE and the network entity when the accessory is installed on the UE.

In some examples, to support transmitting the message indicating the signal quality of the communication link, the message component 1135 is capable of, configured to, or operable to support a means for transmitting, to the UE, an indication of whether to keep the accessory installed on the UE, an indication of a change to a modulation and coding scheme that is based on the accessory being installed on the UE, an indication to switch beams that is based on the accessory being installed on the UE, or any combination thereof. In some examples, to support transmitting the message indicating the signal quality of the communication link, the message component 1135 is capable of, configured to, or operable to support a means for receiving, from the UE, a second message indicating whether the accessory remains installed on the UE, whether the modulation and coding scheme is changed, whether the beams are switched, or any combination thereof.

Figure 12:
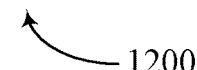
FIG. 12 shows a diagram of a system including a device that supports mitigating impacts of accessories on mmW communications in accordance with one or more aspects of the present disclosure.

FIG. 12 shows a diagram of a system 1200 including a device 1205 that supports mitigating impacts of accessories on mmW communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, a GPU, an NPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting mitigating impacts of accessories on mmW communications). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105 and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for receiving, from a UE, information related to an accessory installable on the UE, where installation of the accessory on the UE is associated with an effect on a signal coverage pattern of the UE. The communications manager 1220 is capable of, configured to, or operable to support a means for communicating, with the UE, in accordance with a set of parameters that are based on the effect of the accessory on the signal coverage pattern of the UE.

By including or configuring the communications manager 1220 in accordance with examples as described herein, the device 1205 may support techniques for improving communications when accessories are installed on UEs for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of mitigating impacts of accessories on mmW communications as described herein, or the at least one processor 1235 and the at least one memory 1225 may be otherwise configured to, individually or collectively, perform or support such operations.

FIG. 13 shows a flowchart illustrating a method 1300 that supports mitigating impacts of accessories on mmW communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting, to a network entity, information related to an accessory installable on the UE, wherein installation of the accessory on the UE is associated with an effect on a signal coverage pattern of the UE. The operations of block 1305 may be performed in accordance with examples as disclosed herein. In some examples, aspects of the operations of 1305 may be performed by an signaling component 725 as described with reference to FIG. 7.

At 1310, the method may include communicating, with the network entity, in accordance with a set of parameters that are based at least in part on the effect of the accessory on the signal coverage pattern of the UE. The operations of block 1310 may be performed in accordance with examples as disclosed herein. In some examples, aspects of the operations of 1310 may be performed by a communication component 730 as described with reference to FIG. 7.

FIG. 14 shows a flowchart illustrating a method 1400 that supports mitigating impacts of accessories on mmW communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, information related to an accessory installable on the UE, wherein installation of the accessory on the UE is associated with an effect on a signal coverage pattern of the UE. The operations of block 1405 may be performed in accordance with examples as disclosed herein. In some examples, aspects of the operations of 1405 may be performed by an signaling component 725 as described with reference to FIG. 7.

At 1410, the method may include configuring a set of beam weights at the UE based at least in part on one or more beam property changes associated with the accessory being installed on the UE, wherein a set of parameters for communicating with the network entity includes the set of beam weights. The operations of block 1410 may be performed in accordance with examples as disclosed herein. In some examples, aspects of the operations of 1410 may be performed by a beam weight configuration component 735 as described with reference to FIG. 7.

At 1415, the method may include communicating, with the network entity, in accordance with the set of parameters that are based at least in part on the effect of the accessory on the signal coverage pattern of the UE. The operations of block 1415 may be performed in accordance with examples as disclosed herein. In some examples, aspects of the operations of 1415 may be performed by a communication component 730 as described with reference to FIG. 7.

FIG. 15 shows a flowchart illustrating a method 1500 that supports mitigating impacts of accessories on mmW communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, information related to an accessory installable on the UE, wherein installation of the accessory on the UE is associated with an effect on a signal coverage pattern of the UE. The operations of block 1505 may be performed in accordance with examples as disclosed herein. In some examples, aspects of the operations of 1505 may be performed by an signaling component 725 as described with reference to FIG. 7.

At 1510, the method may include receiving, from the network entity, an indication of one or more reference signal resources based at least in part on the accessory being installed on the UE, the one or more reference signal resources associated with adapting one or more beam weights at the UE, wherein a set of parameters for communicating with the network entity includes the one or more beam weights. The operations of block 1510 may be performed in accordance with examples as disclosed herein. In some examples, aspects of the operations of 1510 may be performed by a reference signal component 740 as described with reference to FIG. 7.

At 1515, the method may include adapting the one or more beam weights based at least in part on the one or more reference signal resources, wherein the set of parameters includes the one or more adapted beam weights. The operations of block 1515 may be performed in accordance with examples as disclosed herein. In some examples, aspects of the operations of 1515 may be performed by a beam weight adaption component 745 as described with reference to FIG. 7.

At 1520, the method may include communicating, with the network entity, in accordance with the set of parameters that are based at least in part on the effect of the accessory on the signal coverage pattern of the UE. The operations of block 1520 may be performed in accordance with examples as disclosed herein. In some examples, aspects of the operations of 1520 may be performed by a communication component 730 as described with reference to FIG. 7.

FIG. 16 shows a flowchart illustrating a method 1600 that supports mitigating impacts of accessories on mmW communications in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include detecting, by the UE, that the accessory is installed on the UE, wherein information related to the accessory is transmitted based at least in part on the detecting. The operations of block 1605 may be performed in accordance with examples as disclosed herein. In some examples, aspects of the operations of 1605 may be performed by a detection component 765 as described with reference to FIG. 7.

At 1610, the method may include transmitting, to a network entity, the information related to an accessory installable on the UE, wherein installation of the accessory on the UE is associated with an effect on a signal coverage pattern of the UE. The operations of block 1610 may be performed in accordance with examples as disclosed herein. In some examples, aspects of the operations of 1610 may be performed by an signaling component 725 as described with reference to FIG. 7.

At 1615, the method may include communicating, with the network entity, in accordance with a set of parameters that are based at least in part on the effect of the accessory on the signal coverage pattern of the UE. The operations of block 1615 may be performed in accordance with examples as disclosed herein. In some examples, aspects of the operations of 1615 may be performed by a communication component 730 as described with reference to FIG. 7.

FIG. 17 shows a flowchart illustrating a method 1700 that supports mitigating impacts of accessories on mmW communications in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, information related to an accessory installable on the UE, wherein installation of the accessory on the UE is associated with an effect on a signal coverage pattern of the UE. The operations of block 1705 may be performed in accordance with examples as disclosed herein. In some examples, aspects of the operations of 1705 may be performed by an signaling component 1125 as described with reference to FIG. 11.

At 1710, the method may include communicating, with the UE, in accordance with a set of parameters that are based at least in part on the effect of the accessory on the signal coverage pattern of the UE. The operations of block 1710 may be performed in accordance with examples as disclosed herein. In some examples, aspects of the operations of 1710 may be performed by a communication component 1130 as described with reference to FIG. 11.

The following provides an overview of aspects of the present disclosure:

Aspect 1: A method for wireless communications by a UE, comprising: transmitting, to a network entity, information related to an accessory that is installable on the UE and configured to at least partially cover the UE, wherein installation of the accessory on the UE is associated with an effect on a signal coverage pattern of the UE; and communicating, with the network entity, in accordance with a set of parameters that are based at least in part on the effect of the accessory on the signal coverage pattern of the UE.

Aspect 2: The method of aspect 1, wherein transmitting the information related to the accessory comprises: transmitting an indication of one or more beam property changes associated with the accessory being installed on the UE.

Aspect 3: The method of any of aspects 1 through 2, wherein transmitting the information related to the accessory comprises: transmitting an indication of whether the accessory is installed on the UE.

Aspect 4: The method of any of aspects 1 through 3, wherein transmitting the information related to the accessory comprises: transmitting information that indicates one or more properties of the accessory.

Aspect 5: The method of aspect 4, wherein the one or more properties of the accessory includes one or more materials included in the accessory, a dielectric constant associated with the accessory, a loss tangent associated with the accessory, a thickness of the accessory, or any combination thereof.

Aspect 6: The method of any of aspects 4 through 5, further comprising: querying a database for the one or more properties of the accessory; and obtaining, from the database, the one or more properties of the accessory based at least in part on querying the database.

Aspect 7: The method of any of aspects 1 through 6, wherein transmitting the information related to the accessory comprises: transmitting an indication of one or more signal coverage metrics for the UE associated with the installation of the accessory on the UE, wherein the one or more signal coverage metrics are based at least in part on the signal coverage pattern of the UE associated with the installation of the accessory on the UE.

Aspect 8: The method of aspect 7, further comprising: receiving, from the network entity, a message indicating whether a signal coverage metric of the one or more signal coverage metrics satisfies a corresponding signal coverage metric threshold.

Aspect 9: The method of any of aspects 7 through 8, wherein the one or more signal coverage metrics comprises an indication of an in-coverage signal coverage, an indication of an out-of-coverage signal coverage, or both.

Aspect 10: The method of any of aspects 7 through 9, further comprising: receiving, from the network entity, a message indicating a modulation and coding scheme that is based at least in part on the one or more signal coverage metrics indicated via the information related to the accessory, wherein the set of parameters for communicating with the network entity comprises the modulation and coding scheme.

Aspect 11: The method of any of aspects 1 through 10, wherein transmitting the information related to the accessory comprises: transmitting a first indication of one or more signal coverage metrics for a first frequency range and associated with the installation of the accessory on the UE and a second indication of the one or more signal coverage metrics for a second frequency range and associated with the installation of the accessory on the UE.

Aspect 12: The method of any of aspects 1 through 11, further comprising: configuring a set of beam weights at the UE based at least in part on one or more beam property changes associated with the accessory being installed on the UE, wherein the set of parameters for communicating with the network entity includes the set of beam weights.

Aspect 13: The method of aspect 12, further comprising: loading, from memory of the UE and based at least in part on the one or more beam property changes associated with the accessory being installed on the UE, a codebook associated with the accessory being installed on the UE; and selecting, from the codebook, the configured set of beam weights.

Aspect 14: The method of any of aspects 1 through 13, further comprising: receiving, from the network entity, an indication of one or more reference signal resources based at least in part on the accessory being installed on the UE, the one or more reference signal resources associated with adapting one or more beam weights at the UE, wherein the set of parameters for communicating with the network entity includes the one or more beam weights; and adapting the one or more beam weights based at least in part on the one or more reference signal resources, wherein the set of parameters comprises the one or more adapted beam weights.

Aspect 15: The method of any of aspects 1 through 14, further comprising: performing a first signal quality measurement on a communication link between the UE and the network entity before the accessory is installed on the UE; performing a second signal quality measurement of the communication link while the accessory is installed on the UE; and transmitting, to the network entity, a message indicating a difference between the first signal quality measurement and the second signal quality measurement.

Aspect 16: The method of any of aspects 1 through 15, further comprising: receiving, from the network entity, a message comprising an indication of a signal quality of a communication link between the UE and the network entity when the accessory is installed on the UE.

Aspect 17: The method of aspect 16, wherein receiving the message indicating the signal quality of the communication link comprises: receiving, from the network entity, an indication of whether to keep the accessory installed on the UE, an indication of a change to a modulation and coding scheme that is based at least in part on the accessory being installed on the UE, an indication to switch beams that is based at least in part on the accessory being installed on the UE, or any combination thereof; and transmitting, to the network entity, a second message indicating of whether the accessory remains installed on the UE, whether the modulation and coding scheme is changed, whether the beams are switched, or any combination thereof.

Aspect 18: The method of any of aspects 1 through 17, wherein transmitting the information related to the accessory comprises: transmitting information that indicates a type of the accessory, a model number of the accessory, a model indicator of the accessory, a manufacturer of the accessory, or any combination thereof.

Aspect 19: The method of any of aspects 1 through 18, further comprising: detecting, by the UE, that the accessory is installed on the UE, wherein the information related to the accessory is transmitted based at least in part on the detecting.

Aspect 20: The method of any of aspects 1 through 19, wherein the accessory is a phone case or a cover for the UE.

Aspect 21: A method for wireless communications by a network entity, comprising: receiving, from a UE, information related to an accessory that is installable on the UE and configured to at least partially cover the UE, wherein installation of the accessory on the UE is associated with an effect on a signal coverage pattern of the UE; and communicating, with the UE, in accordance with a set of parameters that are based at least in part on the effect of the accessory on the signal coverage pattern of the UE.

Aspect 22: The method of aspect 21, wherein receiving the information related to the accessory comprises: receiving an indication of one or more signal coverage metrics for the UE associated with the installation of the accessory on the UE, wherein the one or more signal coverage metrics are based at least in part on the signal coverage pattern of the UE associated with the installation of the accessory on the UE.

Aspect 23: The method of aspect 22, further comprising: transmitting, to the UE, a message indicating whether a signal coverage metric of the one or more signal coverage metrics satisfies a corresponding signal coverage metric threshold.

Aspect 24: The method of any of aspects 22 through 23, further comprising: transmitting, to the UE, a message indicating a modulation and coding scheme that is based at least in part on the one or more signal coverage metrics indicated via the information related to the accessory, wherein the set of parameters for communicating with the network entity comprises the modulation and coding scheme.

Aspect 25: The method of any of aspects 21 through 24, further comprising: transmitting, to the UE, a message comprising an indication of a signal quality of a communication link between the UE and the network entity when the accessory is installed on the UE.

Aspect 26: The method of aspect 25, wherein transmitting the message indicating the signal quality of the communication link comprises: transmitting, to the UE, an indication of whether to keep the accessory installed on the UE, an indication of a change to a modulation and coding scheme that is based at least in part on the accessory being installed on the UE, an indication to switch beams that is based at least in part on the accessory being installed on the UE, or any combination thereof; and receiving, from the UE, a second message indicating whether the accessory remains installed on the UE, whether the modulation and coding scheme is changed, whether the beams are switched, or any combination thereof.

Aspect 27: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without processing) to cause the UE to perform a method of any of aspects 1 through 20.

Aspect 28: A UE for wireless communications, comprising at least one means for performing a method of any of aspects 1 through 20.

Aspect 29: A non-transitory computer-readable medium storing code for wireless communications, the code comprising instructions executable by one or more processors (e.g., directly, indirectly, after pre-processing, without processing) to perform a method of any of aspects 1 through 20.

Aspect 30: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without processing) to cause the network entity to perform a method of any of aspects 21 through 26.

Aspect 31: A network entity for wireless communications, comprising at least one means for performing a method of any of aspects 21 through 26.

Aspect 32: A non-transitory computer-readable medium storing code for wireless communications, the code comprising instructions executable by one or more processors (e.g., directly, indirectly, after pre-processing, without processing) to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), or ascertaining. Also, "determining" or "identifying" can include receiving (such as receiving information or signaling, e.g., receiving information or signaling for determining, receiving information or signaling for identifying), or accessing (such as accessing data in a memory, or accessing information). Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   transmit, to a network entity, information related to an accessory that is installable on the UE and configured to at least partially cover the UE, wherein installation of the accessory on the UE is associated with an effect on a signal coverage pattern of the UE; and
   communicate, with the network entity, in accordance with a set of parameters that are based at least in part on the effect of the accessory on the signal coverage pattern of the UE.

2. The UE of claim 1, wherein, to transmit the information related to the accessory, the one or more processors are individually or collectively operable to execute the code to cause the UE to:
   transmit an indication of one or more beam property changes associated with the accessory being installed on the UE.

3. The UE of claim 1, wherein, to transmit the information related to the accessory, the one or more processors are individually or collectively operable to execute the code to cause the UE to:
   transmit an indication of whether the accessory is installed on the UE.

4. The UE of claim 1, wherein, to transmit the information related to the accessory, the one or more processors are individually or collectively operable to execute the code to cause the UE to:
   transmit an indication of one or more properties of the accessory.

5. The UE of claim 4, wherein the one or more properties of the accessory includes one or more materials included in the accessory, a dielectric constant associated with the accessory, a loss tangent associated with the accessory, a thickness of the accessory, or any combination thereof.

6. The UE of claim 4, wherein the one or more processors are individually or collectively further operable to execute the code to cause the UE to:
   query a database for the one or more properties of the accessory; and

obtain, from the database, the one or more properties of the accessory based at least in part on querying the database.

7. The UE of claim 1, wherein, to transmit the information related to the accessory, the one or more processors are individually or collectively operable to execute the code to cause the UE to:
transmit an indication of one or more signal coverage metrics for the UE associated with the installation of the accessory on the UE, wherein the one or more signal coverage metrics are based at least in part on the signal coverage pattern of the UE associated with the installation of the accessory on the UE.

8. The UE of claim 7, wherein the one or more processors are individually or collectively further operable to execute the code to cause the UE to:
receive, from the network entity, a message indicating whether a signal coverage metric of the one or more signal coverage metrics satisfies a corresponding signal coverage metric threshold.

9. The UE of claim 7, wherein the one or more signal coverage metrics comprises an indication of an in-coverage signal coverage, an indication of an out-of-coverage signal coverage, or both.

10. The UE of claim 7, wherein the one or more processors are individually or collectively further operable to execute the code to cause the UE to:
receive, from the network entity, a message indicating a modulation and coding scheme that is based at least in part on the one or more signal coverage metrics indicated via the information related to the accessory, wherein the set of parameters for communicating with the network entity comprises the modulation and coding scheme.

11. The UE of claim 1, wherein, to transmit the information related to the accessory, the one or more processors are individually or collectively operable to execute the code to cause the UE to:
transmit a first indication of one or more signal coverage metrics for a first frequency range and associated with the installation of the accessory on the UE and a second indication of the one or more signal coverage metrics for a second frequency range and associated with the installation of the accessory on the UE.

12. The UE of claim 1, wherein the one or more processors are individually or collectively further operable to execute the code to cause the UE to:
configure a set of beam weights at the UE based at least in part on one or more beam property changes associated with the accessory being installed on the UE, wherein the set of parameters for communicating with the network entity includes the set of beam weights.

13. The UE of claim 12, wherein the one or more processors are individually or collectively further operable to execute the code to cause the UE to:
load, from memory of the UE and base at least in part on the one or more beam property changes associated with the accessory being installed on the UE, a codebook associated with the accessory being installed on the UE; and
select, from the codebook, the configured set of beam weights.

14. The UE of claim 1, wherein the one or more processors are individually or collectively further operable to execute the code to cause the UE to:
receive, from the network entity, an indication of one or more reference signal resources based at least in part on the accessory being installed on the UE, the one or more reference signal resources associated with adapting one or more beam weights at the UE, wherein the set of parameters for communicating with the network entity includes the one or more beam weights; and
adapt the one or more beam weights based at least in part on the one or more reference signal resources, wherein the set of parameters comprises the one or more adapted beam weights.

15. The UE of claim 1, wherein the one or more processors are individually or collectively further operable to execute the code to cause the UE to:
perform a first signal quality measurement on a communication link between the UE and the network entity before the accessory is installed on the UE;
perform a second signal quality measurement of the communication link while the accessory is installed on the UE; and
transmit, to the network entity, a message indicating a difference between the first signal quality measurement and the second signal quality measurement.

16. The UE of claim 1, wherein the one or more processors are individually or collectively further operable to execute the code to cause the UE to:
receive, from the network entity, a message comprising an indication of a signal quality of a communication link between the UE and the network entity when the accessory is installed on the UE.

17. The UE of claim 16, wherein, to receive the message indicating the signal quality of the communication link, the one or more processors are individually or collectively operable to execute the code to cause the UE to:
receive, from the network entity, an indication of whether to keep the accessory installed on the UE, an indication of a change to a modulation and coding scheme that is based at least in part on the accessory being installed on the UE, an indication to switch beams that is based at least in part on the accessory being installed on the UE, or any combination thereof; and
transmit, to the network entity, a second message indicating of whether the accessory remains installed on the UE, whether the modulation and coding scheme is changed, whether the beams are switched, or any combination thereof.

18. The UE of claim 1, wherein, to transmit the information related to the accessory, the one or more processors are individually or collectively operable to execute the code to cause the UE to:
transmit an indication of a type of the accessory, a model number of the accessory, a model indicator of the accessory, a manufacturer of the accessory, or any combination thereof.

19. The UE of claim 1, wherein the one or more processors are individually or collectively further operable to execute the code to cause the UE to:
detect, by the UE, that the accessory is installed on the UE, wherein the information related to the accessory is transmitted based at least in part on the detecting.

20. The UE of claim 1, wherein the accessory is a phone case or a cover for the UE.

21. A network entity, comprising:
one or more memories storing processor-executable code; and
one or more processors coupled with the one or more memories and individually or collectively operable to execute the code to cause the network entity to:

receive, from a user equipment (UE), information related to an accessory installable on the UE, wherein installation of the accessory on the UE is associated with an effect on a signal coverage pattern of the UE; and communicate, with the UE, in accordance with a set of parameters that are based at least in part on the effect of the accessory on the signal coverage pattern of the UE.

22. The network entity of claim 21, wherein, to receive the information related to the accessory, the one or more processors are individually or collectively operable to execute the code to cause the network entity to:

receive an indication of one or more signal coverage metrics for the UE associated with the installation of the accessory on the UE, wherein the one or more signal coverage metrics are based at least in part on the signal coverage pattern of the UE associated with the installation of the accessory on the UE.

23. The network entity of claim 22, wherein the one or more processors are individually or collectively further operable to execute the code to cause the network entity to:

transmit, to the UE, a message indicating whether a signal coverage metric of the one or more signal coverage metrics satisfies a corresponding signal coverage metric threshold.

24. The network entity of claim 22, wherein the one or more processors are individually or collectively further operable to execute the code to cause the network entity to:

transmit, to the UE, a message indicating a modulation and coding scheme that is based at least in part on the one or more signal coverage metrics indicated via the information related to the accessory, wherein the set of parameters for communicating with the network entity comprises the modulation and coding scheme.

25. The network entity of claim 21, wherein the one or more processors are individually or collectively further operable to execute the code to cause the network entity to:

transmit, to the UE, a message comprising an indication of a signal quality of a communication link between the UE and the network entity when the accessory is installed on the UE.

26. The network entity of claim 25, wherein, to transmit the message indicating the signal quality of the communication link, the one or more processors are individually or collectively operable to execute the code to cause the network entity to:

transmit, to the UE, an indication of whether to keep the accessory installed on the UE, an indication of a change to a modulation and coding scheme that is based at least in part on the accessory being installed on the UE, an indication to switch beams that is based at least in part on the accessory being installed on the UE, or any combination thereof; and receive, from the UE, a second message indicating whether the accessory remains installed on the UE, whether the modulation and coding scheme is changed, whether the beams are switched, or any combination thereof.

27. A method for wireless communications by a user equipment (UE), comprising:

transmitting, to a network entity, information related to an accessory installable on the UE, wherein installation of the accessory on the UE is associated with an effect on a signal coverage pattern of the UE; and communicating, with the network entity, in accordance with a set of parameters that are based at least in part on the effect of the accessory on the signal coverage pattern of the UE.

28. The method of claim 27, wherein transmitting the information related to the accessory comprises:

transmitting an indication of one or more beam property changes associated with the accessory being installed on the UE.

29. A method for wireless communications by a network entity, comprising:

receiving, from a user equipment (UE), information related to an accessory installable on the UE, wherein installation of the accessory on the UE is associated with an effect on a signal coverage pattern of the UE; and communicating, with the UE, in accordance with a set of parameters that are based at least in part on the effect of the accessory on the signal coverage pattern of the UE.

30. The method of claim 29, wherein receiving the information related to the accessory comprises:

receiving an indication of one or more signal coverage metrics for the UE associated with the installation of the accessory on the UE, wherein the one or more signal coverage metrics are based at least in part on the signal coverage pattern of the UE associated with the installation of the accessory on the UE.

* * * * *